(12) United States Patent
Ueda et al.

(10) Patent No.: US 7,176,839 B2
(45) Date of Patent: Feb. 13, 2007

(54) ANTENNA UNIT

(75) Inventors: Shinsuke Ueda, Shijonawate (JP); Hideki Oka, Neyagawa (JP); Kazuhiro Matsumoto, Hirakata (JP); Masayuki Matsuo, Neyagawa (JP); Takashi Saeki, Hirakata (JP); Hiroshi Chujo, Tsu (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/536,981

(22) PCT Filed: Oct. 25, 2004

(86) PCT No.: PCT/JP2004/015782

§ 371 (c)(1),
(2), (4) Date: May 31, 2005

(87) PCT Pub. No.: WO2005/078971

PCT Pub. Date: Aug. 25, 2005

(65) Prior Publication Data

US 2006/0007046 A1    Jan. 12, 2006

(30) Foreign Application Priority Data

Feb. 17, 2004   (JP) .............................. 2004-040308

(51) Int. Cl.
*H01Q 1/24* (2006.01)

(52) U.S. Cl. .................. 343/702; 343/702; 343/841; 343/872; 455/90.3; 455/575.5

(58) Field of Classification Search ................ 343/702, 343/841, 872; 455/90.3, 575.5
See application file for complete search history.

(56) References Cited

U.S. PATENT DOCUMENTS 6,539,207 B1   3/2003   del Castillo et al.
6,985,111 B2 *  1/2006  Hara et al. .................. 343/702

(Continued)

FOREIGN PATENT DOCUMENTS

EP   0 680 112   11/1995
GB   2 101 412    1/1983

(Continued)

OTHER PUBLICATIONS

PCT International Search Report for PCT/JP2004/015782 mailed on Feb. 22, 2005.

(Continued)

*Primary Examiner*—Hoang V. Nguyen
*Assistant Examiner*—Dieu Hien Duong
(74) *Attorney, Agent, or Firm*—Rader, Fishman & Grauer PLLC

(57) ABSTRACT

This antenna unit is adapted to be connected to an electronic device for transmitting a received radio signal to the electronic device. The antenna unit comprises a noise canceller for canceling noise generated in the electronic device and transmitted to the antenna unit through a ground line. The noise canceller is a conductive stub piece one end of which is electrically connected to an electromagnetic shield of the antenna unit and the other end of which is a free end. The stub piece has a length of about ¼ of a wavelength of the radio signal.

17 Claims, 25 Drawing Sheets

U.S. PATENT DOCUMENTS

2004/0263399 A1    12/2004    Lin et al.

FOREIGN PATENT DOCUMENTS

| JP | 11-298202 A1 | 10/1999 |
|----|---|---|
| JP | 2000-292522 | 10/2000 |
| JP | 2000-292522 A1 | 10/2000 |
| JP | 2003-180431 A1 | 7/2003 |
| TW | 572 378 | 1/2004 |

OTHER PUBLICATIONS

Supplementary European Search Report dated Aug. 16, 2006 for Application No. 04792919.5-2411.

George E. Ponchak et al.: "Open- and Short-Circuit Terminated Series Stubs in Finite-Width Coplanar Waveguide on Silicon", IEEE Transactions On Microwave Theory And Techniques, IEEE Service Center, Piscataway, NJ, US, vol. 45, No. 6, Jun. 1997.

* cited by examiner about $\lambda/4$

FIG. 32
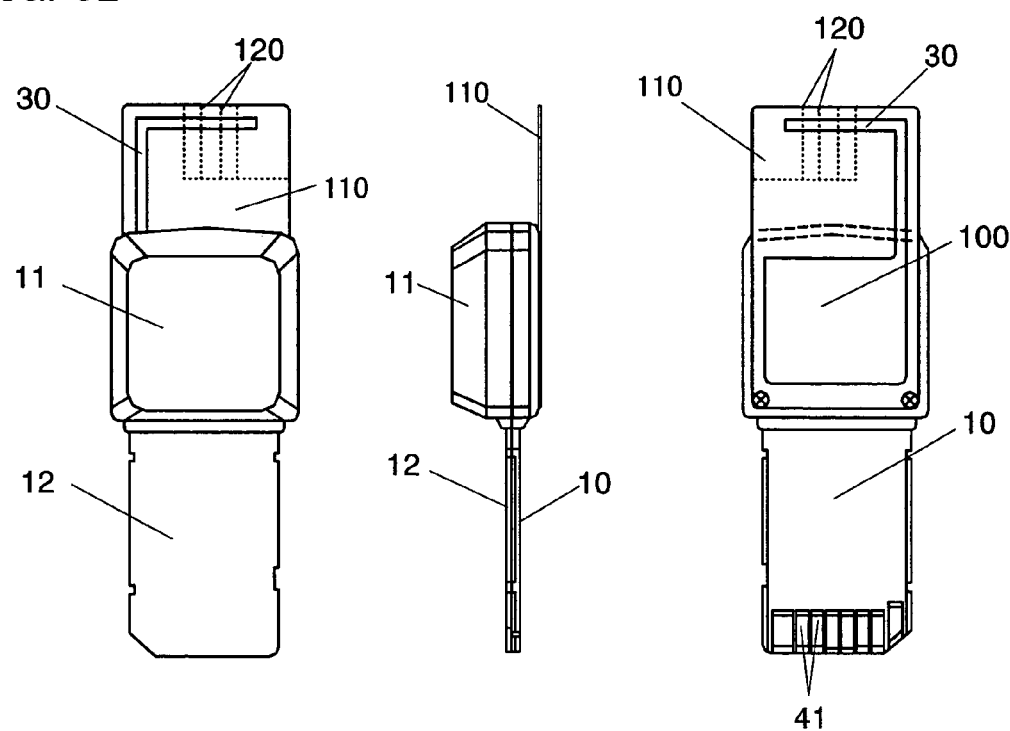
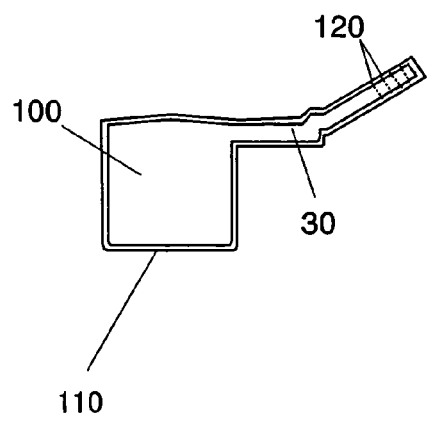
FIG. 33A
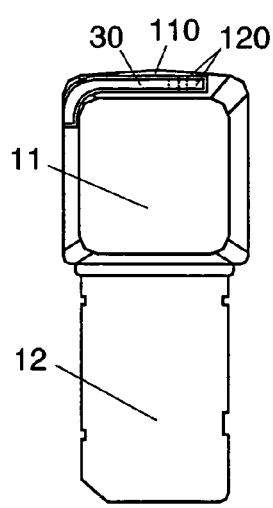
FIG. 33B
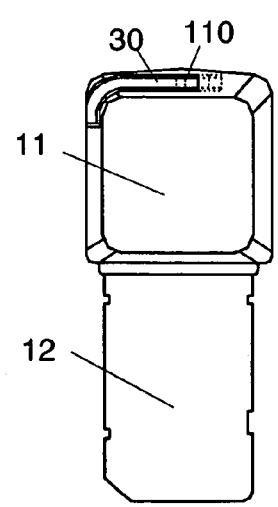
FIG. 33C

ANTENNA UNIT

This application is a 371 of PCT/JP04/15782 Oct. 25, 2004.

TECHNICAL FIELD

This invention relates to an antenna unit adapted to be connected to an electronic device for transmitting a received radio signal to the electronic device.

BACKGROUND ART

Japanese Non-examined Patent Publication No. 2000-292522 discloses an antenna unit for GPS (Global Positioning System). This antenna unit is adapted to be inserted into an electronic device, such as a PDA and a notebook, and receives a satellite signal from a GPS satellite and transmits data, such as an actual location, to the electronic device. In this antenna unit, the distance from the electronic device to an antenna built into this antenna unit can be extended so as to reduce the possibility that noise generated at a CPU, etc. of the electronic device is propagated through midair and affects the antenna unit.

By the way, the noise transmitted from the electronic device to the antenna unit includes noise transmitted from the device to the unit through a ground line that connects between a ground of the electronic device and that of the antenna unit, in addition to the noise propagated through midair, as mentioned above. If the noise of the ground line is transmitted to the antenna unit, it may reduce the receiver sensitivity of the antenna unit because it may destabilize a ground level and destroy the waveform of the received radio signal. Although the above-mentioned antenna unit can reduce the noise propagated through midair, it can not reduce the noise transmitted through the ground line.

DISCLOSURE OF THE INVENTION

In view of the above problem, the object of the present invention is to provide an antenna unit which can reduce the noise transmitted to the antenna unit from an electronic device through the ground line and prevent the reduction of the receiver sensitivity.

The antenna unit in accordance with the present invention is adapted to be connected to an electronic device for transmitting a received radio signal to the electronic device, and comprises an antenna, a signal processing module, a substrate, a terminal interface, an electromagnetic shield, and a case. The antenna receives a radio signal. The signal processing module converts the radio signal received by the antenna into signal data to be transmitted to the electronic device. The substrate carries the antenna and the signal processing module, and has a circuit ground forming a ground of the signal processing module. The terminal interface has an array of terminals for electrical connection with the electronic device, and includes a ground line leading from a ground terminal provided in the array of terminals to the circuit ground. The electromagnetic shield surrounds the signal processing module so as to electromagnetically isolate the signal processing module from the antenna, and is electrically connected to the circuit ground. The case is made of insulating resin, and accommodates therein the antenna, the substrate, the signal processing module, the terminal interface, and the electromagnetic shield while exposing the array of terminals.

The feature of the present invention resides in that the antenna unit further includes a noise canceller for canceling noise generated in the electronic device and transmitted to the circuit ground through the ground line. The noise canceller comprises a conductive stub piece one end of which is electrically connected to the electromagnetic shield and the other end of which is a free end, and the stub piece has a length of about ¼ of a wavelength of the radio signal.

By providing the stub piece, a part of the noise transmitted to the electromagnetic shield through the ground line is branched to the stub piece. Since the length of the stub piece is about ¼ of the wavelength of the radio signal, the noise having the same frequency as the radio signal will lag 180 degrees behind noise which was not branched to the stub piece, when the noise goes to and from the stub piece one time, namely when the noise travels a distance of one-half of the wavelength. Therefore, the noise which was branched to the stub piece and the noise which was not branched to the stub piece cancel each other out, so that the noise can be reduced.

Thus, by the noise canceller, the antenna unit of the present invention can reduce the noise having the same frequency as the radio signal among the noise transmitted to the antenna unit from the electronic device through the ground line, so that it can prevent reduction of the receiver sensitivity.

The stub piece may be made of a wire, or may be formed by cutting a part of the electromagnetic shield and bending it.

Or, the stub piece may be a rod member which is extendable relative to the case.

Or, the stub piece may be a rod member, and the case may have a receptacle on an outer bottom thereof whose inner surface is electrically connected to the electromagnetic shield, and one end of the stub piece may be inserted into the receptacle and electrically connected to the electromagnetic shield through the inner surface of the receptacle.

Or, the stub piece may be a rod member one end of which is pivotally supported on the outer bottom of the case.

Or, the stub piece may be in the form of a flat plate. In this case, preferably, the stub piece is disposed on the outer bottom of the case and is provided with a vertical plate which electromagnetically insulates the antenna unit from the electronic device when the antenna unit is connected to the electronic device. By providing the vertical plate, the noise propagated through midair can also be easily cut off. It is also preferable that the stub piece is in a form of a fan, and the noise canceller comprises two or more the stub pieces, and one end of each of the stub pieces is pivotally supported on the outer bottom of the case.

It is also preferable that the electromagnetic shield is disposed on an inner bottom of the case, and the antenna unit further comprises a plate which is capacitively coupled to the electromagnetic shield through the bottom of the case, and one end of the stub piece is connected to the plate, and the stub piece is electrically connected to the electromagnetic shield through the plate.

In this case, the plate may be attached to the outer bottom of the case, and the stub piece may be formed by cutting a part of the plate and bending it.

Or, the stub piece may be insert-molded into the case together with the plate.

Or, the antenna unit may further include a sheet member attached to the outer bottom of the case, and the plate and the stub piece may be formed in the sheet. Or, the antenna unit may further include a case cover attached to the outer bottom of the case, and the plate and the stub piece may be insert-molded into the case cover.

Or, the plate may be attached to the outer bottom of the case, and the stub piece may be in a form of a flat plate extending from the plate. In this case, preferably, the plate is provided with a vertical plate which electromagnetically insulates the antenna unit from the electronic device when the antenna unit is connected to the electronic device. Or, it is also preferable that the plate and the stub piece are a fan-shaped plate, and the noise canceller comprises two or more said fan-shaped plates, and one end of each of the fan-shaped plates is pivotally supported on the outer bottom of the case.

BRIEF DESCRIPTION OF THE DRAWINGS

FIG. 32 is a modified form of the stub piece of the antenna unit of FIG. 29.

FIG. 33A is a modified form of the stub piece of the antenna unit of FIG. 25.

FIG. 33B is a view of the antenna unit to which the stub piece of FIG. 33A is attached.

FIG. 33C is a view showing the stub piece of FIG. 33B whose one end was cut.

BEST MODE FOR CARRYING OUT THE INVENTION

Hereinafter, the present invention will be described in more detail with reference to the accompanying drawings.

(A First Embodiment)

Figure 1:
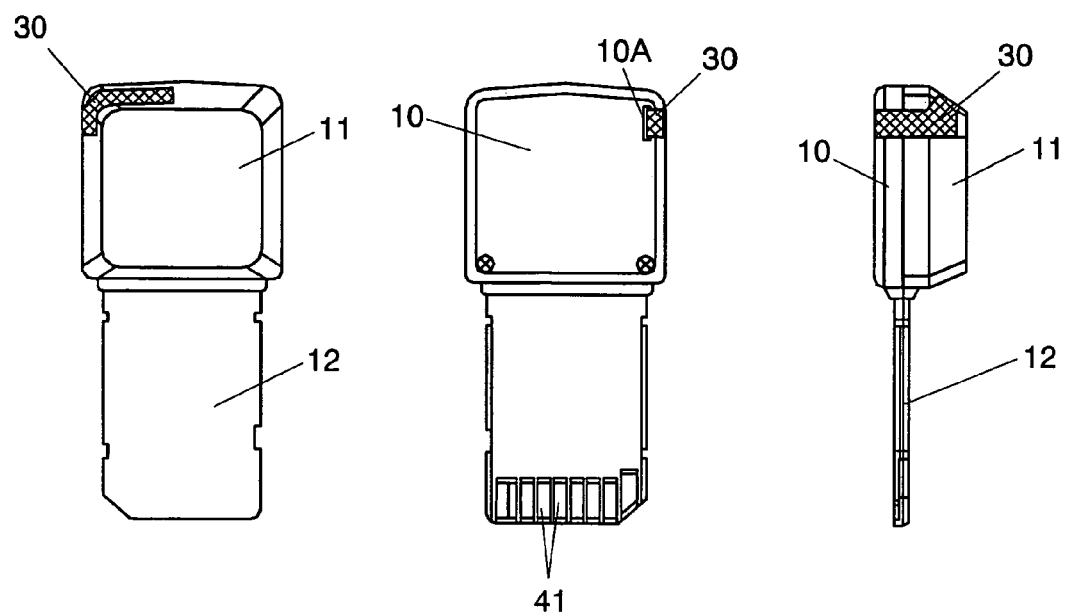
FIG. 1 is a view showing an antenna unit in accordance with a first embodiment of the present invention.
Figure 2:
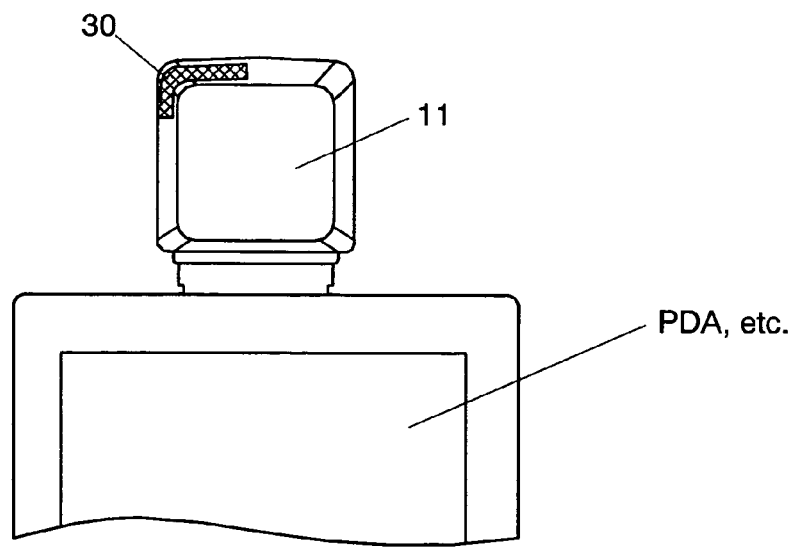
FIG. 2 is a view showing the antenna unit connected to the PDA.

FIG. 1 shows an antenna unit in accordance with a first embodiment of the present invention. As shown in FIG. 2, the antenna unit is a GPS antenna unit, which is inserted into a SD card interface of an electronic device, such as a PDA, a notebook, etc., and receives a satellite signal from a GPS satellite, and sends data, such as an actual location, to the electronic device.

Figure 3:
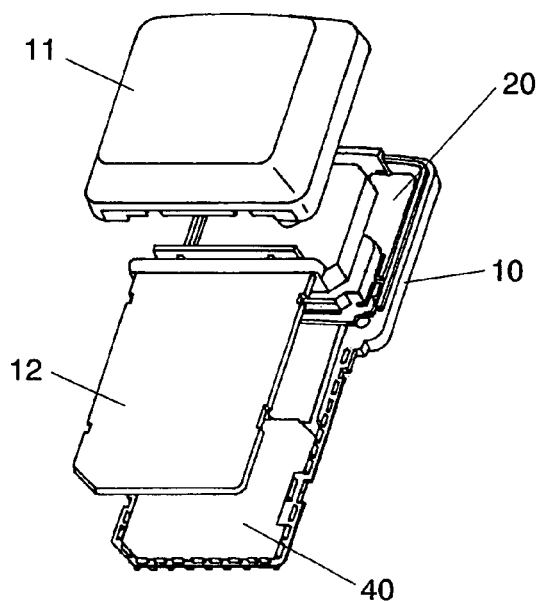
FIG. 3 is a exploded view of the antenna unit.

As shown in FIG. 3A, a case of the antenna unit is made of insulating resin, and it comprises a base 10, and a head cover 11 and an interface cover 12 which are attached to the base 10.

Figure 4:
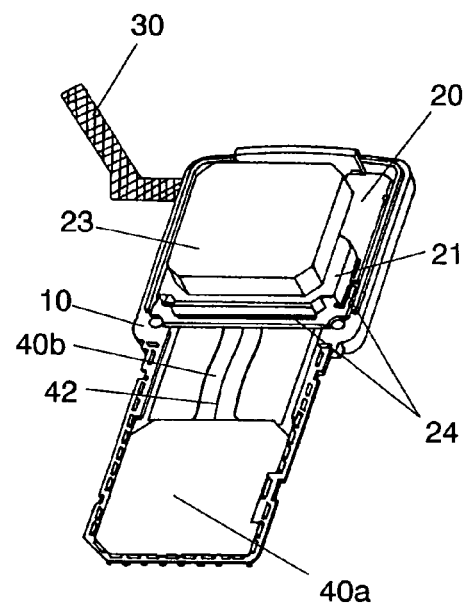
FIG. 4 is a view showing the antenna unit whose head cover and interface cover were removed.

As shown in FIG. 4, a substrate 20 is housed in a section of the base 10 which is covered by the head cover 11. Signal processing modules constituted by many circuit elements are mounted on both surfaces of the substrate 20, and they are surrounded by an electromagnetic shields 21, 22 provided on the both surfaces of the substrate 20. An antenna 23 for receiving the satellite signal from the GPS satellite is fixed on the electromagnetic shield 21 on the upper surface side of the substrate 20, and the antenna 23 is electromagnetically isolated from the signal processing modules by the electromagnetic shields. The signal processing modules demodulate the satellite signal received by the antenna 23 into GPS signal and convert the GPS signal into signal data based on the protocol of the SD (Secure Digital) standard, and transmit the signal data to the electronic device through a terminal interface 40 which will be described later. A circuit ground 24, which forms a ground of the signal processing module, is formed across both of the surfaces of the substrate 20, and the electromagnetic shields 21, 22 are electrically connected to the circuit ground 24.

Figure 5:
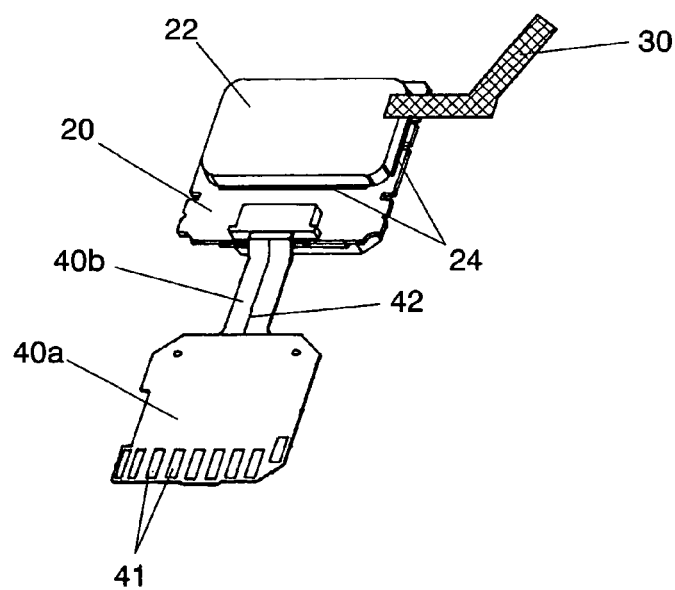
FIG. 5 is a rear view of a substrate and IO substrate of the antenna unit.

As shown in FIG. 5, a conductive stub piece 30 is connected to the electromagnetic shield 22 on the back side of the substrate 20. The stub piece 30 is made of a thin metal plate, and one end thereof is electrically connected to the electromagnetic shield and the other end thereof is a free end, that is, an electrical open end. The stub piece 30 is drawn from the base 10 to the outside through a hole 10A formed on the bottom of the base 10 (see FIG. 1), and then it is adhered to the base 10 and the head cover 11 along the outer surfaces thereof. The stub piece 30 will be described in more detail later.

A terminal interface 40 is housed in a section of the base 10 which is covered by the interface cover 12. The terminal interface 40 comprises an IO substrate 40a, which is formed based on an interface standard for SD card, and flat cables 40b for connecting between the IO substrate 40a and the substrate 20. As shown in FIG. 5, an array of terminals 41, which is adapted to be connected to an array of terminals provided in an interface of the electronic device when the antenna unit was inserted in the electronic device, is formed on the back side of the IO substrate 40a. As shown in FIG. 1, the array of terminals 41 is exposed to the outside through a plurality of holes provided in the base 10. The array of terminals 41 includes a ground terminal which is adapted to be connected to a ground terminal of the electronic device. The flat cables 40b include a ground line 42 leading from the ground terminal to the circuit ground 24 of the substrate 20.

Figure 6:
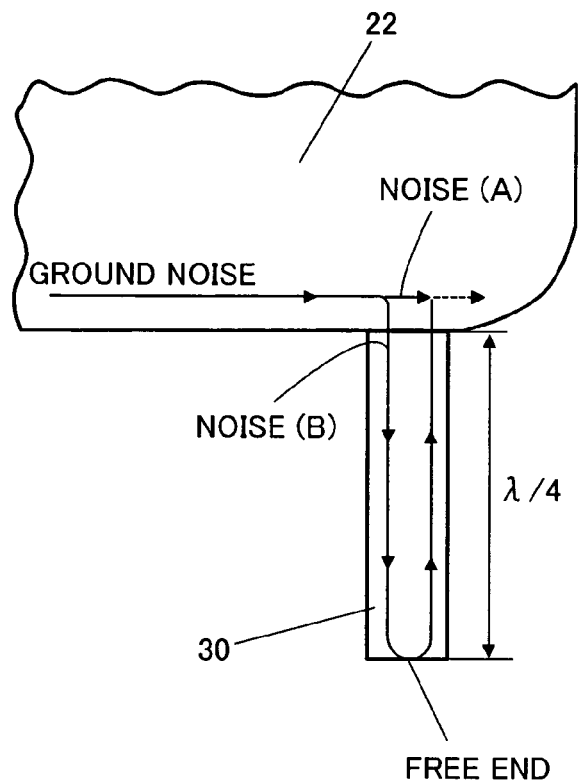
FIG. 6 is a view for explaining a role of a stub piece of the antenna unit.

Hereinafter, the stub piece 30 will be described in more detail. The stub piece 30 constitutes a noise canceller for canceling noise generated in a CPU, etc. of the electronic device and transmitted to the circuit ground 24 through the ground terminal of the array of terminals 41 and the ground line 42. The length of the stub piece 30 is set to about ¼ of a wavelength of the satellite signal. Concretely speaking, since the wavelength of a radio signal, such as the satellite signal, is represented by the following mathematical formula: $\lambda = C/f$ wherein "$\lambda$" is the wavelength ([m]) of the radio signal, "C" is a speed of an electric wave ($C=3.0\times10^8$ [m/s]), and "f" is a frequency ([Hz]) of the radio signal, the length of the stub piece can be obtained by multiplying the wavelength $\lambda$ calculated by the above formula by ¼. For example, when the frequency of the satellite signal received from the GPS satellite is about 1.6 GHz (about 1575.42 MHz), the length of the stub piece is in a range from 4.0 to 5.0 [cm], and preferably, the length is about 4.7 [cm]. In the same way, when the frequency of the satellite signal is about 1.2 GHz, the length of the stub piece is in a range from 6.0 to 6.5 [cm], and preferably, the length is about 6.3 [cm]. The function of the stub piece will be described below with reference to FIG. 6. For the sake of understanding, the stub piece is described in a straight line shape, in FIG. 6. The noise generated in the electronic device is transmitted to the electromagnetic shields 21, 22 and the antenna 23 through the ground terminal of the terminal interface 40, the ground line 42, and the circuit ground 24. The noise reached the electromagnetic shield 22 is branched to a branched noise (B) which runs through the stub piece 30 and a straight noise (A) which runs through the electromagnetic shield 22 without being branched. The branched noise (B) runs toward the free end of the stub piece 30, and is totally reflected at the free end, and returns to the electromagnetic shield 22. Since the length of the stub piece 30 is about ¼ of the wavelength of the satellite signal, branched noise (B) having the same frequency as the satellite signal lags 180 degrees behind the straight noise (A) when the branched noise (B) goes to and from the stub piece 30 one time, namely, when the branched noise (B) travels a distance of one-half of the wavelength of the satellite signal. Therefore, the straight noise (A) and the branched noise (B) which has gone to and from the stub piece 30 cancel each other out, so the ground noise is reduced.

Although, in general, the noise on the ground line exists over a wide range of frequencies, the noise at about the same frequency as the satellite signal can be reduced by providing the stub piece 30 having the length of ¼ of the wavelength of the satellite signal, and the ground level at the frequency of the satellite signal can be stabilized. Thus, the antenna unit having the stub piece 30 can receive the satellite signal with high sensitivity.

Of course, the stub piece 30 can reduce noise generated in the antenna unit itself as well as the noise transmitted from the electronic device.

Although, in this embodiment, the stub piece 30 is connected to the electromagnetic shield 22 on the back side of the substrate 20, the stub piece 30 may be connected to the electromagnetic shield 21 on the front side of the substrate 20 or to the circuit ground 24. That is, the stub piece 30 should just be electrically connected to a part where the noise on the ground is transmitted.

Figure 7:
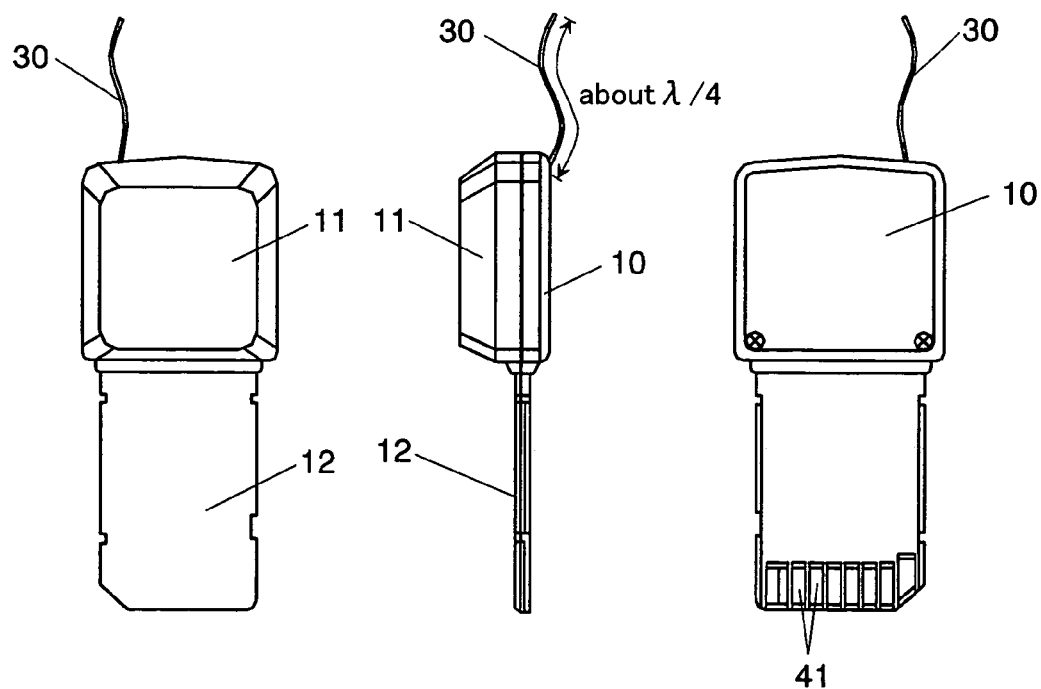
FIG. 7 is a modified form of the stub piece of FIG. 1.
Figure 8:
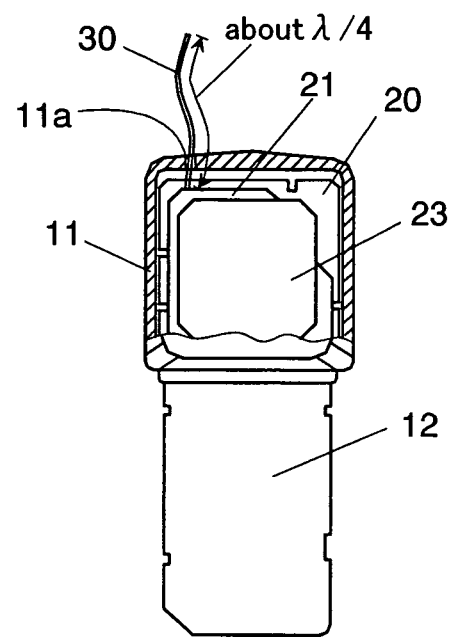
FIG. 8 is a fragmentary sectional view of the antenna unit of FIG. 7.

Further, although the stub piece 30 of the present embodiment is made of a thin metal plate, the stub piece 30 may be made of a wire, such as a lead wire, as shown in FIG. 7. As shown in FIG. 8, one end of the wire is connected to the electromagnetic shield 21 by solder, etc., on the front side of the substrate 20, and the wire is extracted to the outside from a hole 11a provided in the head cover 11. The length of the wire from the one end thereof to the other end is about ¼ of the wavelength of the satellite signal. In this case, because the wire is cheap, the increasing in cost necessary for the stub piece can be reduced.

Figure 9:
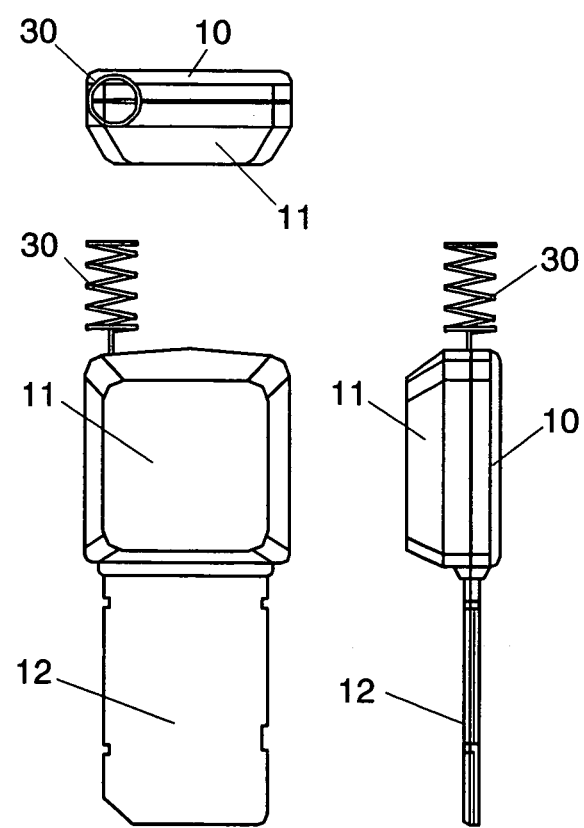
FIG. 9 is a modified form of the stub piece of FIG. 7.
Figure 10:
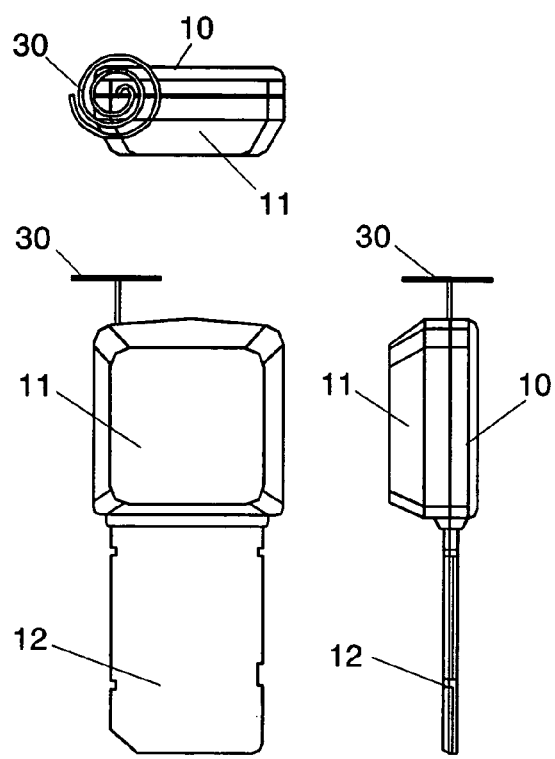
FIG. 10 is a modified form of the stub piece of FIG. 7.
Figure 11:
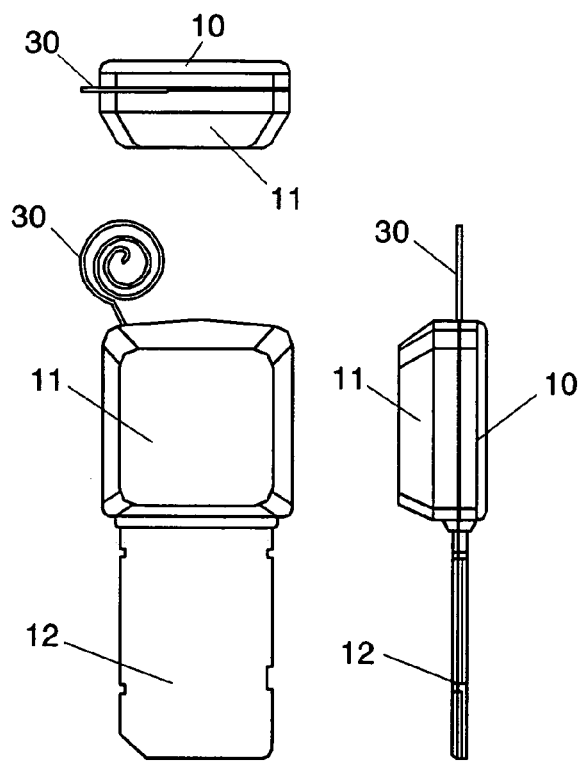
FIG. 11 is a modified form of the stub piece of FIG. 7.
Figure 12:
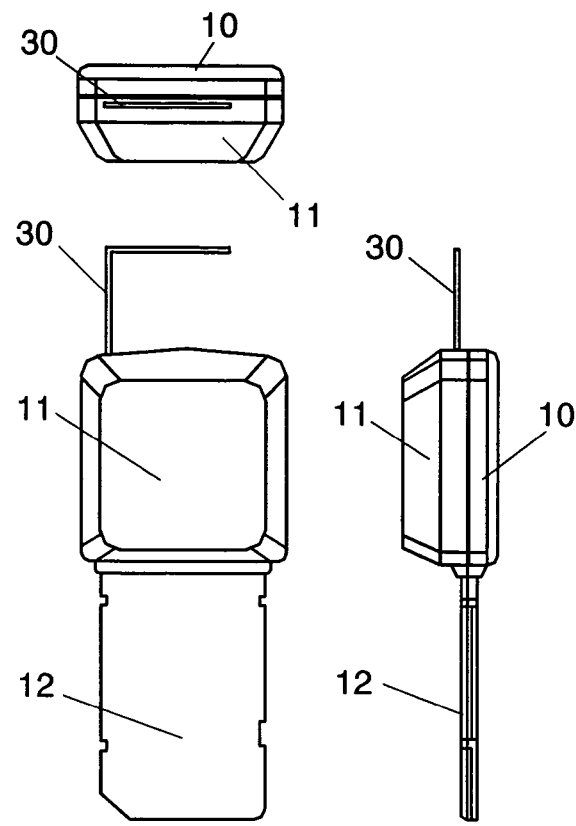
FIG. 12 is a modified form of the stub piece of FIG. 7.

As shown in FIG. 9, the front end of the stub piece 30 made of a wire may be wound in a spring configuration. In this case, an overhang of the wire can be shortened. Alternatively, as shown in FIG. 10, the front end of the stub piece 30 may be wound along a plane perpendicular to the case. In this case, the overhang of the wire can be more shortened. Alternatively, as shown in FIG. 11, the front end of the stub piece 30 may be wound along a plane parallel to the case. In this case, the stub piece does not project downward beyond the bottom of the case, therefore, the stub piece 30 will not receive an excessive pressure from a desk or a floor when the antenna unit is put on the desk or the floor, so, breakage of the stub piece 30 can be prevented. Alternatively, the front end of the stub piece 30 may be bent within a width of the case, as shown in FIG. 12.

Figure 13A:
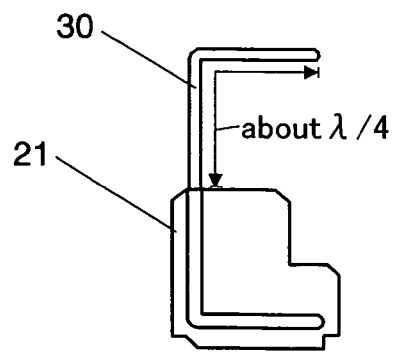
FIG. 13A is a view for explaining one of the methods for making the stub piece.
Figure 13B:
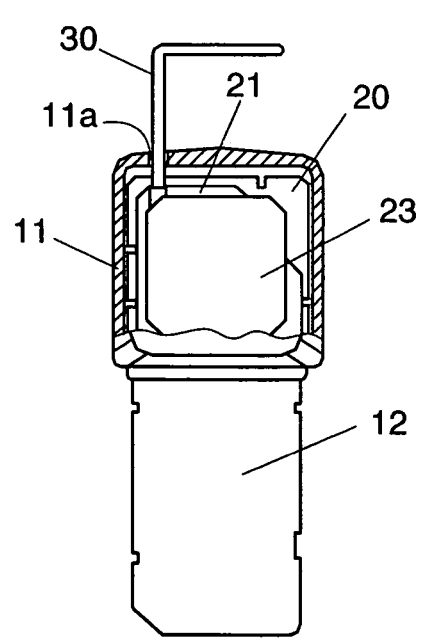
FIG. 13B is a fragmentary sectional view of the antenna unit including the stub piece of FIG. 13A.

As shown in FIG. 13A and FIG. 13B, the stub piece 30 may be formed by cutting a part of the upper surface of the electromagnetic shield 21 on the front side of the substrate 20 and bending it. The length of the stub piece 30 from the root thereof to the tip is about ¼ of the wavelength of the satellite signal. In this case, the material of the stub piece 30 can be reduced. Of course, the stub piece 30 may be formed by cutting a part of the electromagnetic shield 21 on the backside of the substrate 20 and bending it.

Figure 14A:
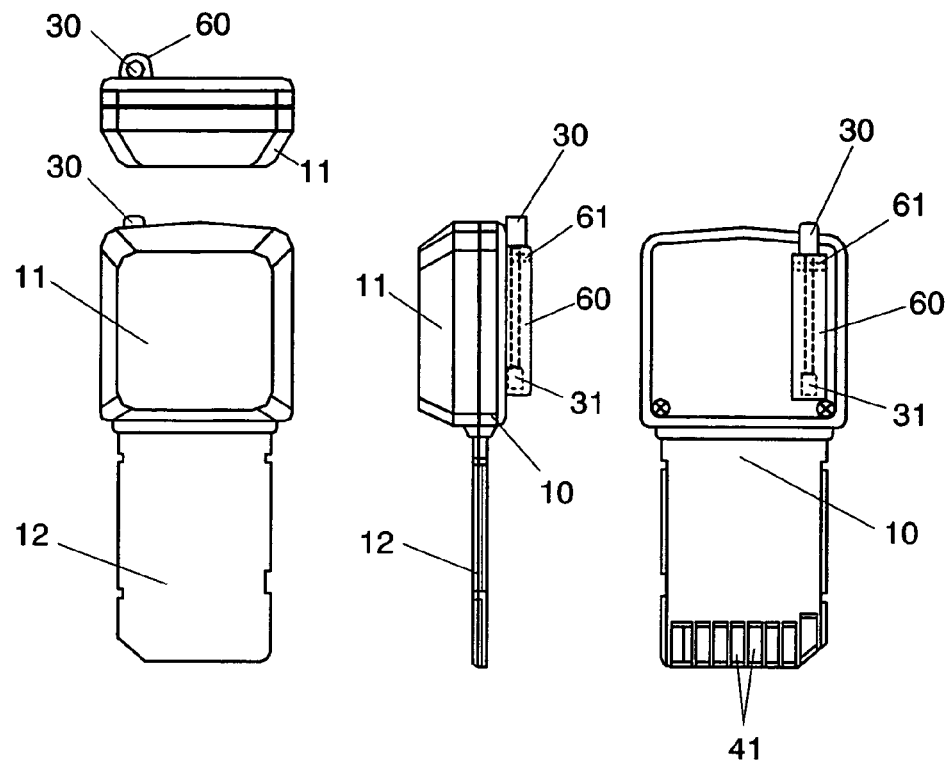
FIG. 14A is a modified form of the stub piece of the antenna unit of FIG. 1.
Figure 14B:
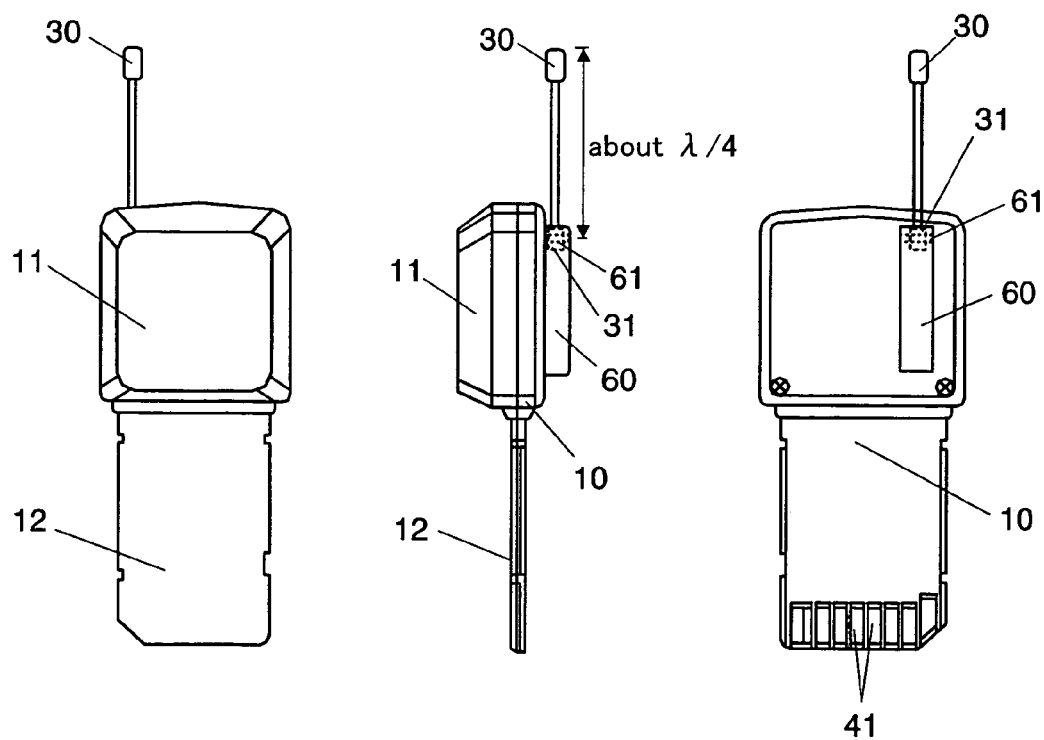
FIG. 14B is a view of the stub piece of FIG. 14A in an extended state.

As shown in FIG. 14A and FIG. 14B, the stub piece 30 may be a rod member which is extendable relative to the case. In FIG. 14A and FIG. 14B, the base 10 has a receptacle 60 on its backside which has a vertically long space inside it, and the rod-like stub piece 30 can be put in the receptacle 60. A bead-like hardware 61 is built in the upper part of the receptacle 60 and is electrically connected to the electromagnetic shield 22. An intermediate part of the stub piece 30 can pass through the bead-like hardware 61. The stub piece 30 has a conductive surface 31 at the lower end thereof, which is exposed to the outside. As shown in FIG. 14B, when the stub piece 30 was pulled up from the receptacle 60, the conductive surface 31 is engaged with the hardware 61, so that the stub piece 30 is electrically connected to the electromagnetic shield 22. The length of the stub piece 30 from the conductive surface 31, namely the lower end, to the tip thereof is about ¼ of the wavelength of the satellite signal. In this case, while the stub piece 30 is housed in the receptacle 60, the stub piece 30 is not connected to the electromagnetic shield 22, so the stub piece 30 does not work as the noise canceller. Therefore, a user can put the stub piece 30 in the receptacle 60 while there is little influence of the ground noise or while the user does not use the antenna unit, and the user can pull up the stub piece 30 and use it only when receiver sensitivity deteriorates. In this case, breakage of the stub piece 30 can be prevented while the stub piece is not used.

Figure 15A:
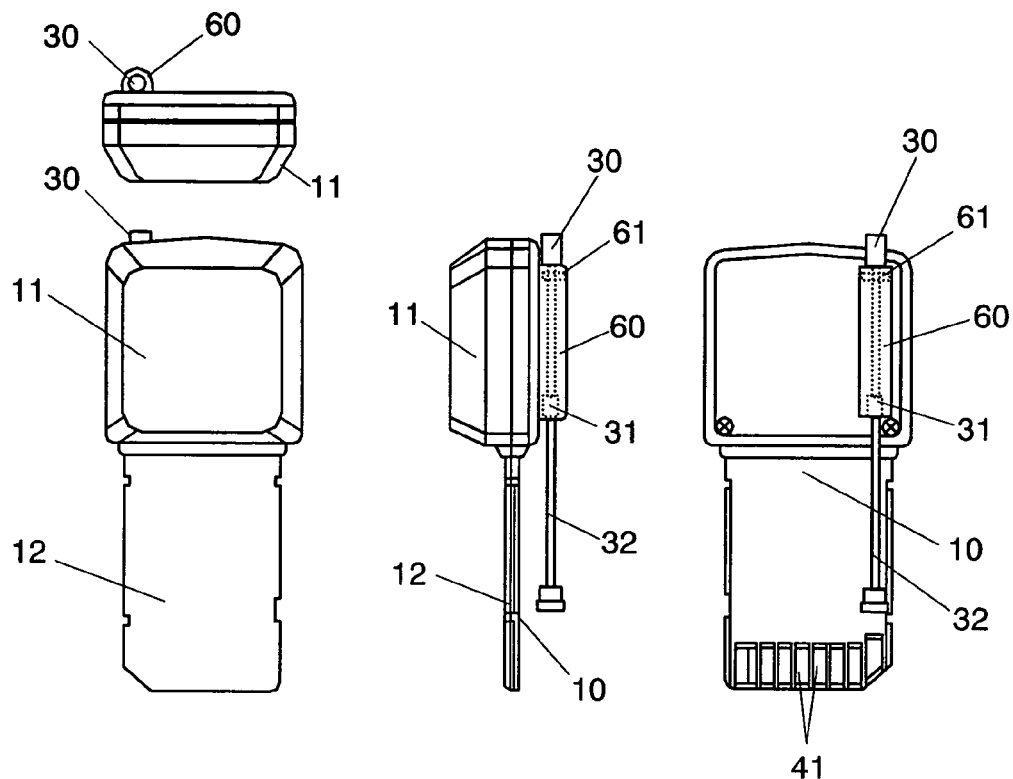
FIG. 15A is a modified form of the stub piece of the antenna unit of FIG. 14A.
Figure 15B:
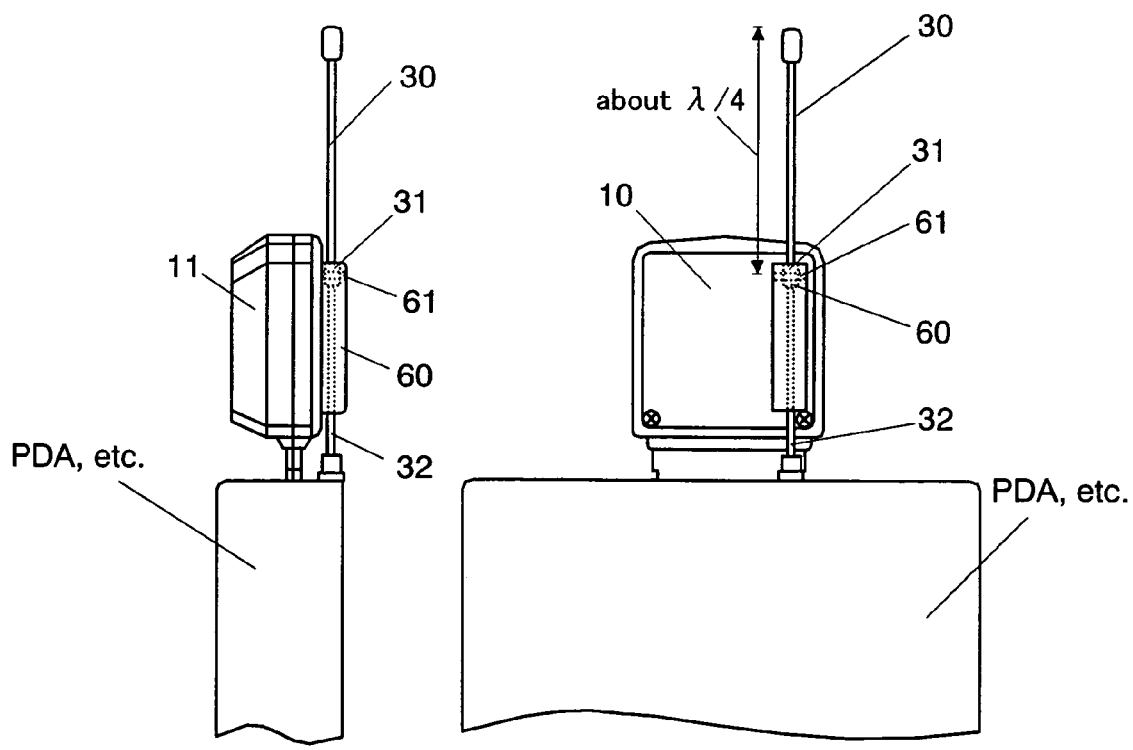
FIG. 15B is a view showing the antenna unit of FIG. 15A which is inserted into an electronic device.

Preferably, as shown in FIG. 15A, the stub piece 30 is provided with a pushrod 32, which is made of a nonconductive material and extends from the bottom of the conductive surface 31 of the stub piece 30 and penetrates the bottom of the receptacle 60. In this case, as shown in FIG. 15B, when the antenna unit was inserted into the interface of the electronic device such as a PDA, the lower end of the pushrod 32 is pushed by a side surface of the electronic device, so that the stub piece 30 is automatically pulled up. Therefore, time and effort to pull up the stub piece 30 can be saved. Because the pushrod 32 is a nonconductor, it does not have an influence on the function of the noise canceller.

Figure 16A:
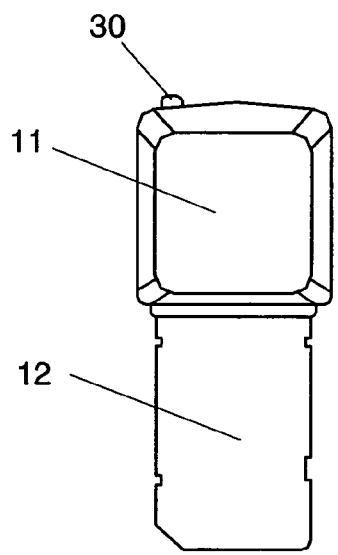
FIG. 16A is a modified form of the stub piece of the antenna unit of FIG. 1.
Figure 16B:
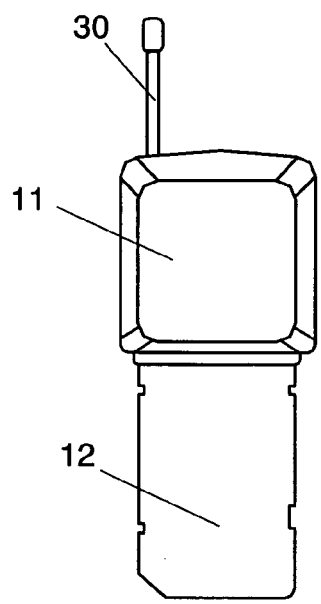
FIG. 16B is a view showing the stub piece of FIG. 16A which was extended one level.
Figure 16C:
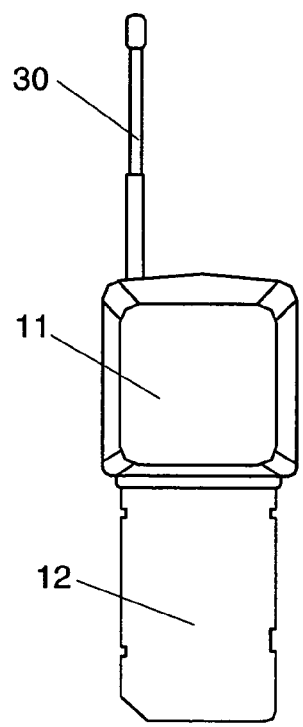
FIG. 16C is a view showing the stub piece of FIG. 16B which was extended one more levels.

Alternatively, as shown in FIGS. 16A to 16C, the stub piece 30 may be configured so that the stub piece itself can be extensible. In this case, as shown in FIG. 16A, breakage of the stub piece 30 can be prevented by just shrinking the stub piece 30 as far as possible. Further, as shown in FIG. 16B and FIG. 16C, a user can select a proper length of the stub piece with respect to the satellite signals of different frequencies (for example, about 1.6 GHz or 1.2 GHz) by extending one or more levels of the stub piece 30.

Figure 17:
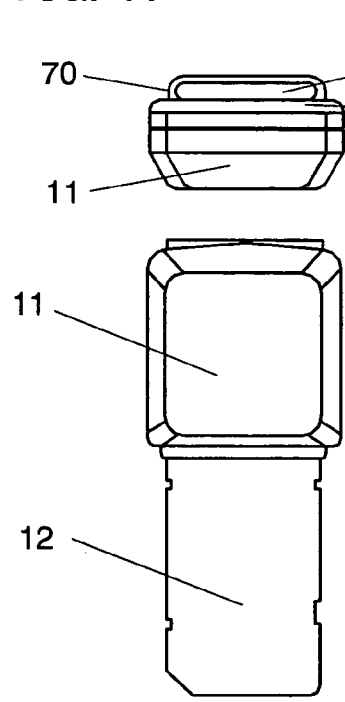
FIG. 17 is a modified form of the stub piece of the antenna unit of FIG. 1.
Figure 17:
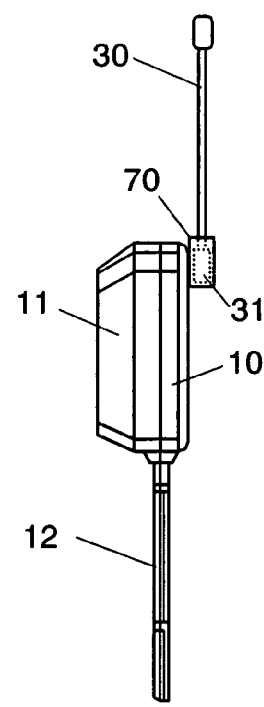
Figure 17:
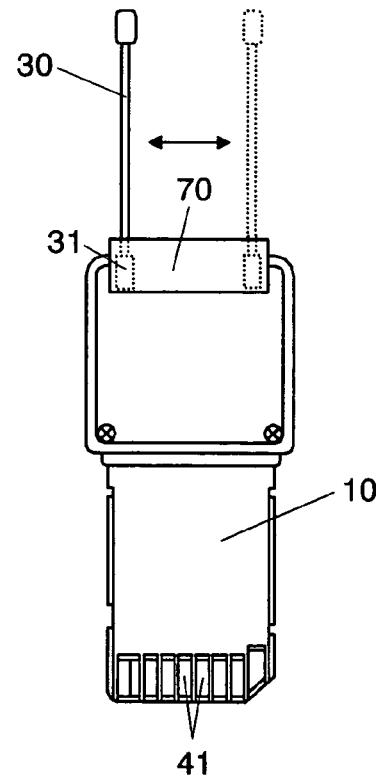

Alternatively, as shown in FIG. 17, the stub piece 30 may be the rod member and a receptacle 70 having an insertion hole 71 into which the lower end of the stub piece 30 can be inserted may be provided on the backside of the case. The inner surface of the insertion hole 71 is electrically connected to the electromagnetic shield 22. The conductive surface 31 is exposed to the outside at the lower end of the stub piece 30 and is electrically connected to the electromagnetic shield 22 through the inner surface of the insertion hole 71. The length of the stub piece 30 from the conductive surface 31 to the tip thereof is about ¼ of the wavelength of the satellite signal. The insertion hole 71 is horizontally long, and a user can continuously shift a position of the stub piece 30 inserted into the insertion hole 71 along the lateral direction of the insertion hole 71 by hand. The receiver sensitivity may be improved by shifting the insertion position of the stub piece 30 continuously. Further, while the stub piece 30 is not used, breakage of the stub piece 30 can be prevented by detaching the stub piece.

Figure 18:
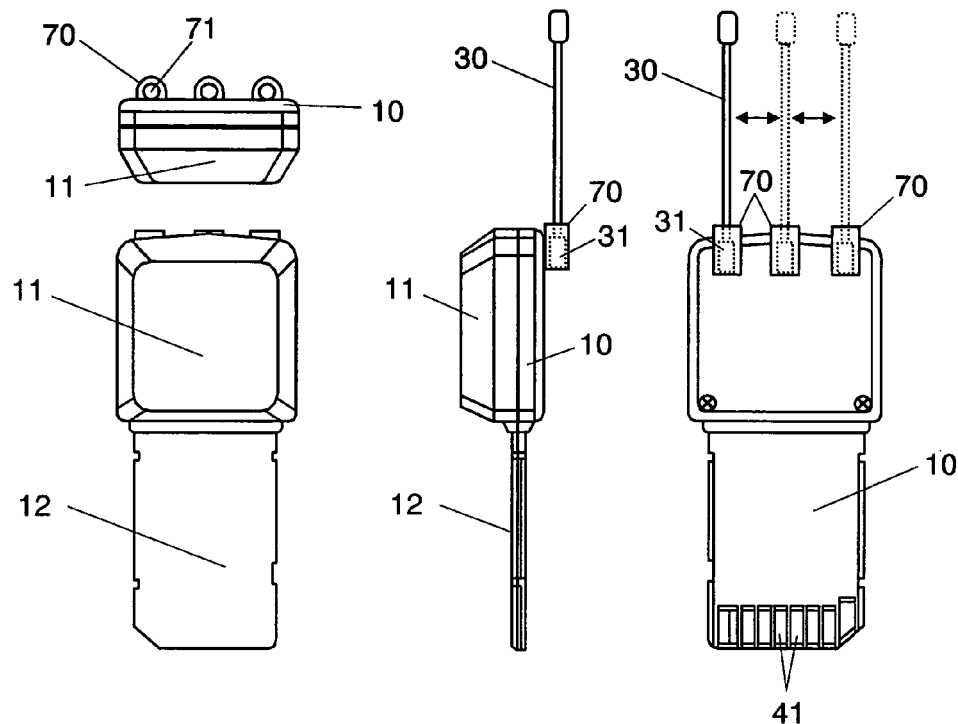
FIG. 18 is a modified form of the stub piece of the antenna unit of FIG. 1.

Alternatively, as shown in FIG. 18, two or more receptacles 70 may be provided on the backside of the case, and the stub piece 30 may be inserted into the insertion hole 71 of any one of the receptacles 70. The inner surfaces of all insertion holes 71 are electrically connected to the electromagnetic shield 22. The conductive surface 31 is exposed to the outside at the lower end of the stub piece 30, and is electrically connected to the electromagnetic shield 22 through the inner surface of the insertion hole 71. The receiver sensitivity may be improved by shifting the insertion position of the stub piece 30 discontinuously.

Figure 19A:
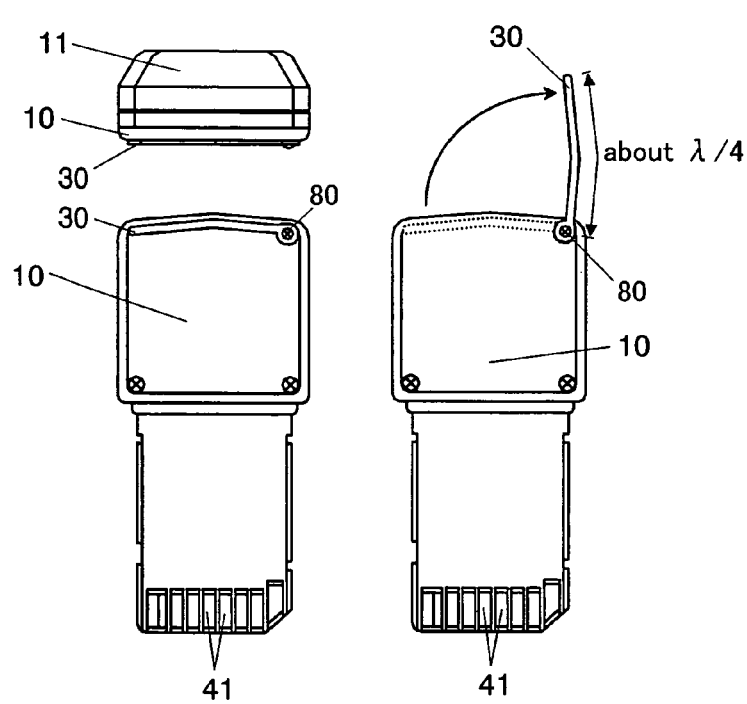
FIG. 19A is a modified form of the stub piece of the antenna unit of FIG. 1.
Figure 19B:
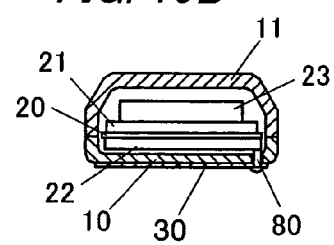
FIG. 19B is a sectional view of the antenna unit of FIG. 19A.
Figure 20:
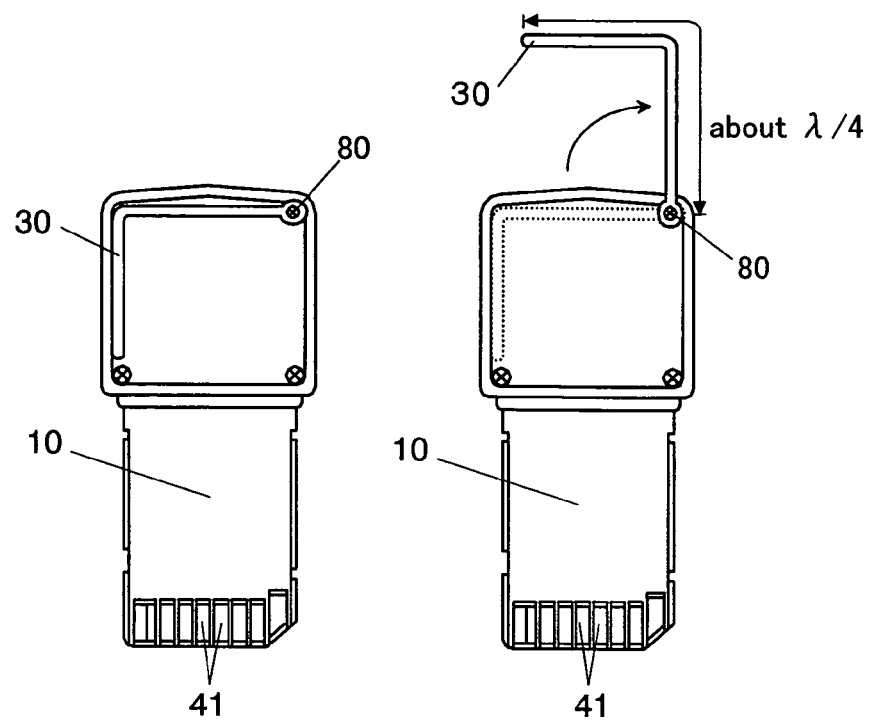
FIG. 20 is a modified form of the stub piece of the antenna unit of FIG. 19A.

Alternatively, as shown in FIG. 19A, the stub piece 30 may be a rod member whose one end is pivotally supported on the outer bottom of the case. The one end of the stub piece 30 is supported on the outer bottom of the case by a conductive screw 80. As shown in FIG. 19B, the tip of the screw 80 penetrates the base 10 and is electrically connected to the electromagnetic shield 22. The stub piece 30 is electrically connected to the electromagnetic shield 22 through the screw 80. The length of the stub piece 30 from the one end thereof to the tip is about ¼ of the wavelength of the satellite signal. The screw 80 fixes the base 10 to the head cover 11 as well as supports the stub piece 30. In this case, the stub piece 30 can be hidden behind the case in a situation where the stub piece 30 gets in the way, for example, in a situation where the antenna unit is not used. Furthermore, it is easy to install the stub piece 30 because the stub piece 30 can be installed on the backside of the antenna unit after assembling the antenna unit. A stopper for restricting the rotation of the stub piece 30 may be provided on the case. If the stub piece can not be hidden behind the case, the stub piece 30 may be bent, as shown in FIG. 20.

Figure 21:
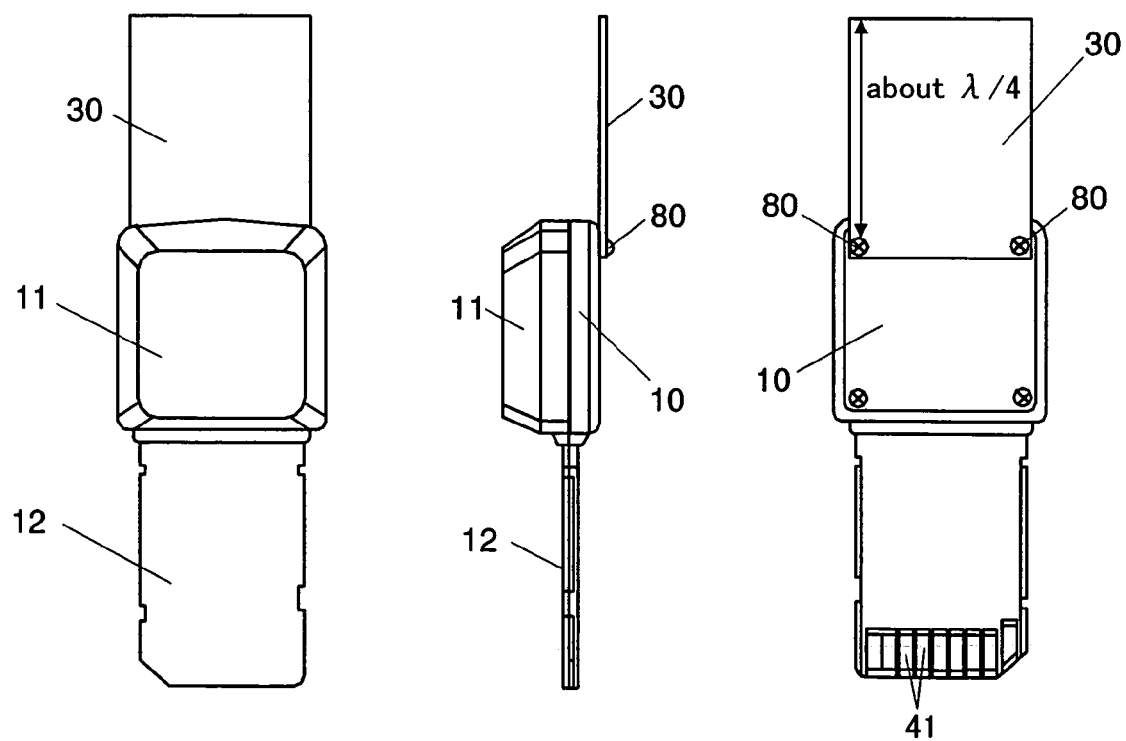
FIG. 21 is a modified form of the stub piece of the antenna unit of FIG. 1.
Figure 22:
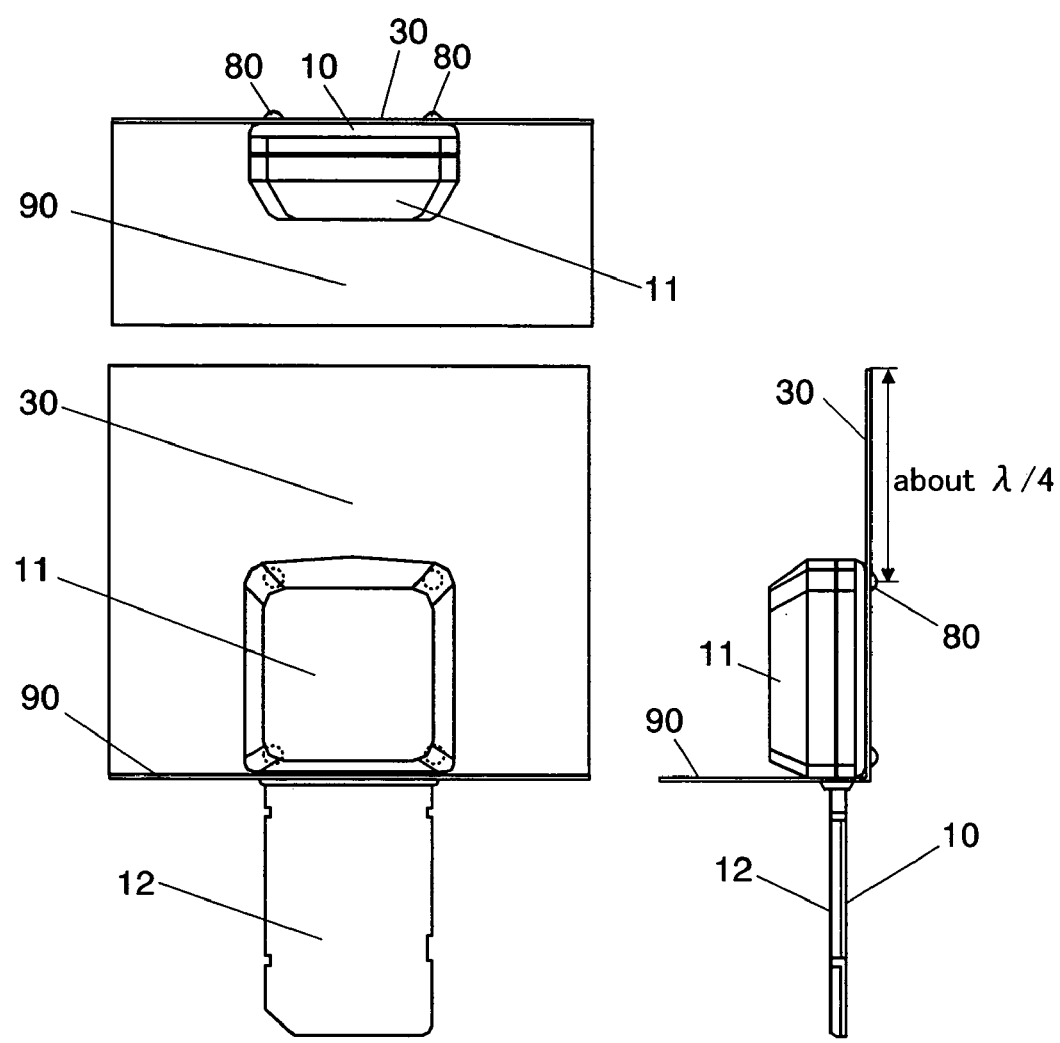
FIG. 22 is a modified form of the stub piece FIG. 21.

The form of the stub piece 30 is not limited to the line shape (the straight line shape or the curved line shape) as described above, but it may be in a form of a rectangular flat plate, as shown in FIG. 21. In FIG. 21, one edge of the stub piece 30 is fixed on the outer bottom of the case by the screws 80. The tips of the screws 80 penetrate the base 10 and electrically connected to the electromagnetic shield 22. The length of the stub piece 30 from each screw 80 to the front edge is about ¼ of the wavelength of the satellite signal. Further, it is preferable that, as shown in FIG. 22, the stub piece 30 is extended toward the interface cover 12 side, and is provided with a vertical plate 90 which electromagnetically insulates the antenna unit from the electronic device when the antenna unit is connected to the electronic device, namely when the antenna unit is inserted into the electronic device. In this case, it becomes easy to block the noise propagated to the antenna unit from the electronic device through midair by the vertical plate 90, so the unit can enhance the effect of reducing the noise. For information, in FIG. 22, the longitudinal length of a main body of the antenna unit is about 7 cm, the width thereof is about 3 cm, and the height thereof is about 1.4 cm. And, the length and width of the stub piece 30 are about 7 cm, respectively, and the longitudinal length of the stub piece which projects from the head cover 11 in the plan view is about 4 cm. The height of the vertical plate 90 is about 3 cm.

Figure 23A:
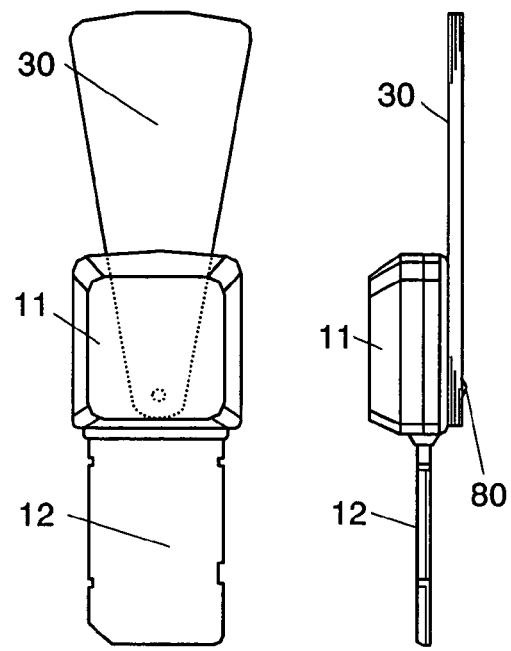
FIG. 23A is a modified form of the stub piece FIG. 21.
Figure 23B:
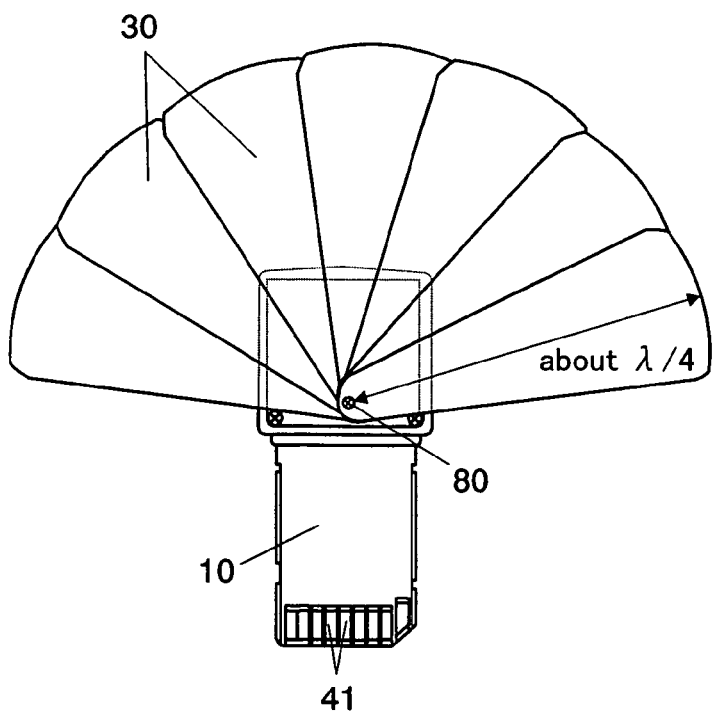
FIG. 23B is a view of the stub piece of FIG. 23A in an opened state.
Figure 24A:
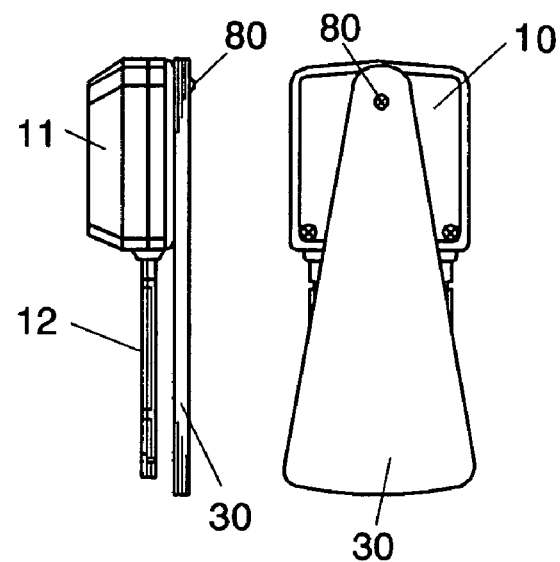
FIG. 24A is a modified form of the stub piece FIG. 23A.
Figure 24B:
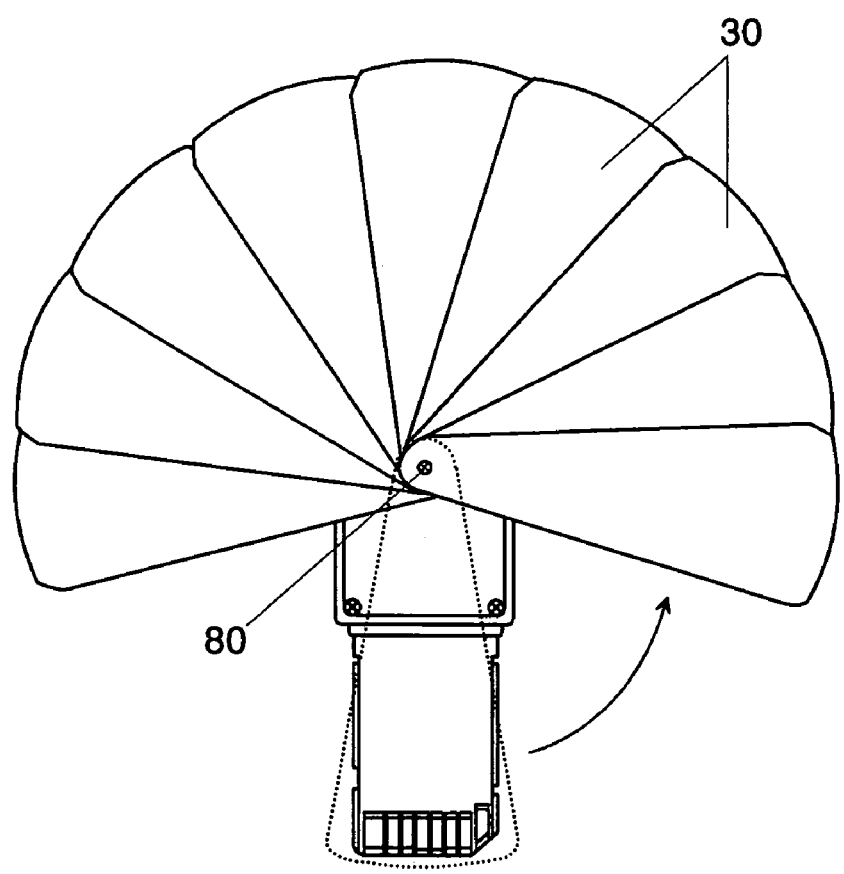
FIG. 24B is a view of the stub piece of FIG. 24A in an opened state.

It is also preferable that, as shown in FIG. 23A and FIG. 23B, the stub piece 30 is a fan-shaped plate, and the antenna unit is provided with two or more stub pieces as the noise canceller, and one end of each of the stub pieces 30 is pivotally supported on the outer bottom of the case by a screw 80. The tip of the screw 80 penetrates the base 10 and is electrically connected to the electromagnetic shield 22. The length of each of the stub pieces from the screw 80 to the front edge thereof is about ¼ of the wavelength of the satellite signal. As shown in FIG. 23B, a user can spread those stub pieces 30 to one fan shape to give an uniform stub length over a predetermined direction around the antenna unit. Thus, the effect of reducing the noise can be enhanced. The stub pieces will not get in the way of the user by being grouped together while they are not used. As shown in FIG. 24A, if the stub pieces 30 are fixed on the front edge side of the base 10, a user can hide the stub pieces 30 behind the case when the user does not use the stub pieces, so the stub pieces will not get in the way of the user more. When the user wants to use the stub pieces 30, the user can rotate the stub pieces 180 degrees, and spread them to the fan shape, as shown in FIG. 24B.

Although the GPS antenna unit is described in this embodiment, the antenna unit of the present invention is not limited to the GPS antenna unit. For example, the antenna unit may be a LAN antenna unit which will be inserted into the electronic device such as a notebook and receive a wireless LAN signal and transmit the received signal to the electronic device. Further, although the antenna unit in this embodiment has an interface for a SD card, the unit may have an interface based on another standard, of course.

(A Second Embodiment)

Figure 25:
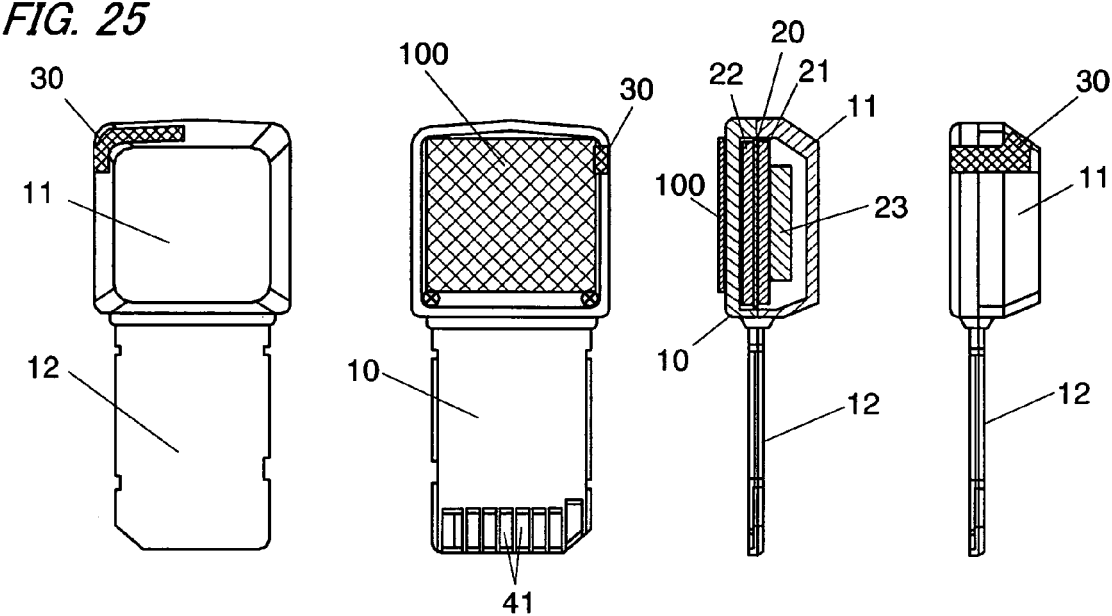
FIG. 25 is a view of an antenna unit in accordance with a second embodiment of the present invention.

FIG. 25 shows an antenna unit in accordance with a second embodiment of the present invention. The basic composition of this embodiment is identical to the first embodiment, so the similar part of these embodiments are identified by the same reference character and no duplicate explanation is made here.

In this antenna unit, a plate 100 made of a thin metal plate is bonded to the outer bottom of the case, and is capacitively coupled to the electromagnetic shield 22 disposed on an inner bottom of the base 10 through the bottom of the base. The stub piece 30 is made of a thin metal plate, and one end thereof is electrically connected to the plate 100. The stub piece 30 is electrically connected to the electromagnetic shield 22 through the plate 100. The length of the stub piece 30 is about ¼ of a wavelength of the satellite signal.

In this embodiment, the noise generated in the electronic device is transmitted to the plate 100 capacitively coupled to the electromagnetic shield 22, through the ground terminal of the terminal interface 40, the ground line 42, and the circuit ground 24. A part of the noise transmitted to the plate 100 is branched to the stub piece 30 and is totally reflected at the free end of the stub piece 30. Then, the noise branched to the stub piece 30 and the noise running through the plate 100 without being branched cancel each other out on the same principle as the first embodiment, so that the ground noise at about the same frequency as the satellite signal can be reduced. Thus, the antenna unit having the stub piece 30 can receive the satellite signal with high sensitivity.

In this embodiment, it is easy to manufacture the antenna unit because the noise canceller can be constructed by just bonding the plate 100 and the stub piece 30 to the case after assembling the antenna unit.

Figure 26:
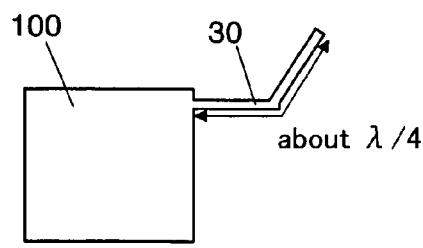
FIG. 26 is a view for explaining one of the methods for making the stub piece of FIG. 25.
Figure 27:
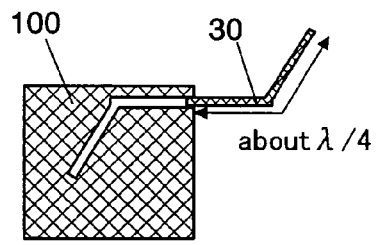
FIG. 27 is a view for explaining another method for making the stub piece of FIG. 25.

Instead of forming the stub piece 30 from a metal plate separate from the plate 100, the stub piece 30 may be formed from the same metal plate as the plate 100, as shown in FIG. 26. Alternatively, as shown in FIG. 27, the stub piece 30 may be formed from the plate 100 by cutting a part of the plate 100 and bending it. In this case, the material of the stub piece 30 can be reduced. If the stub piece 30 is too thin, the stub piece 30 is easily damaged. So, it is preferable that the stub piece 30 has a certain degree of thickness, if the stub piece 30 is used in a situation where it is exposed outwardly, not bonded to the outer surface of the head cover 11 as the stub piece of FIG. 25. For information, even if the stub piece 30 is formed by cutting a part of the plate 100, it does not affect the capacity coupling between the plate 100 and the electromagnetic shield as long as the length of the stub piece is about ¼ of the wavelength of the satellite signal.

Figure 28:
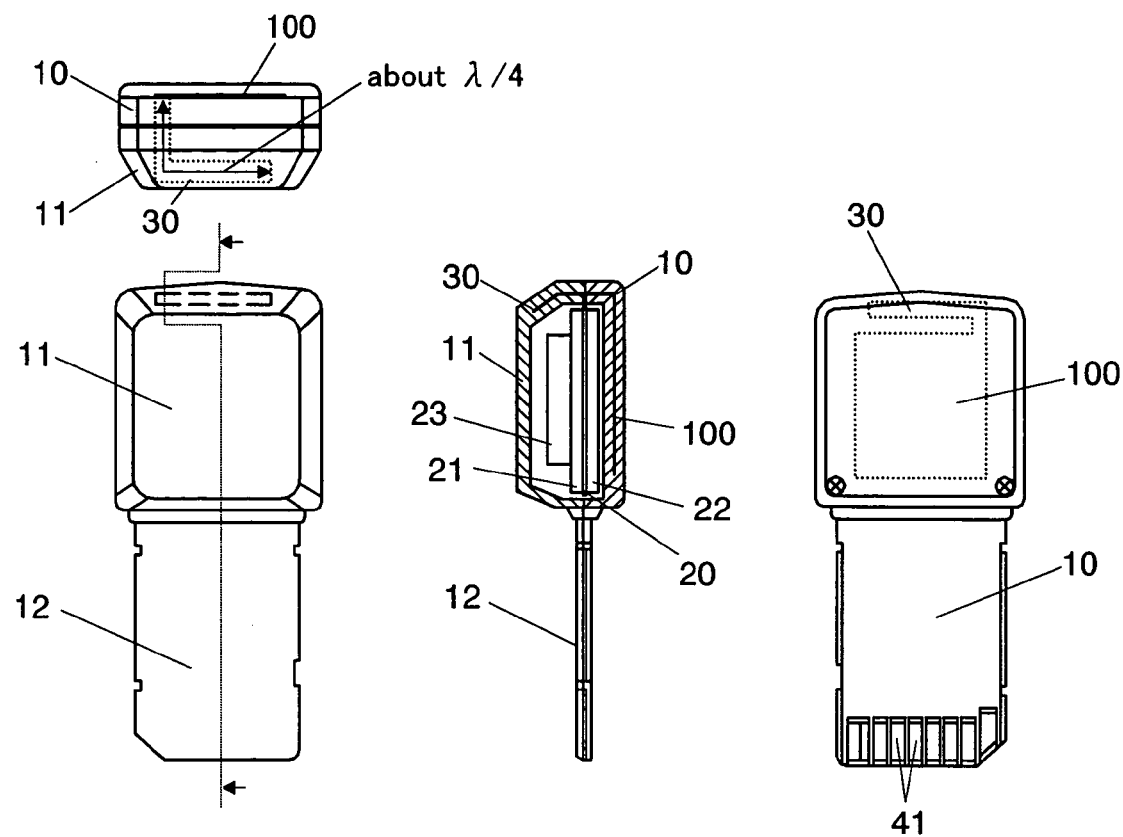
FIG. 28 is a view of the antenna unit having a insert-molded stub piece and plate.

Alternatively, as shown in FIG. 28, the stub piece 30 may be insert-molded into the case together with the plate 100. In FIG. 28, the plate 100 is insert-molded into the bottom of the base 10 so that it will make the capacity coupling with the electromagnetic shield 22. The stub piece 30 comprises two separate parts; a part which is extended from the plate 100 and insert-molded into the base 10, and a part insert-molded into the head cover 11. And, when the base 10 and the head cover 11 were assembled, these two parts are electrically connected to each other. The length from the connection between the plate 100 and the stub piece 30 to the tip of the stub piece 30 inside the head cover 11 is about ¼ of the wavelength of the satellite signal. In this case, the number of parts can be reduced, thus it becomes easy to assemble the antenna unit.

Figure 29:
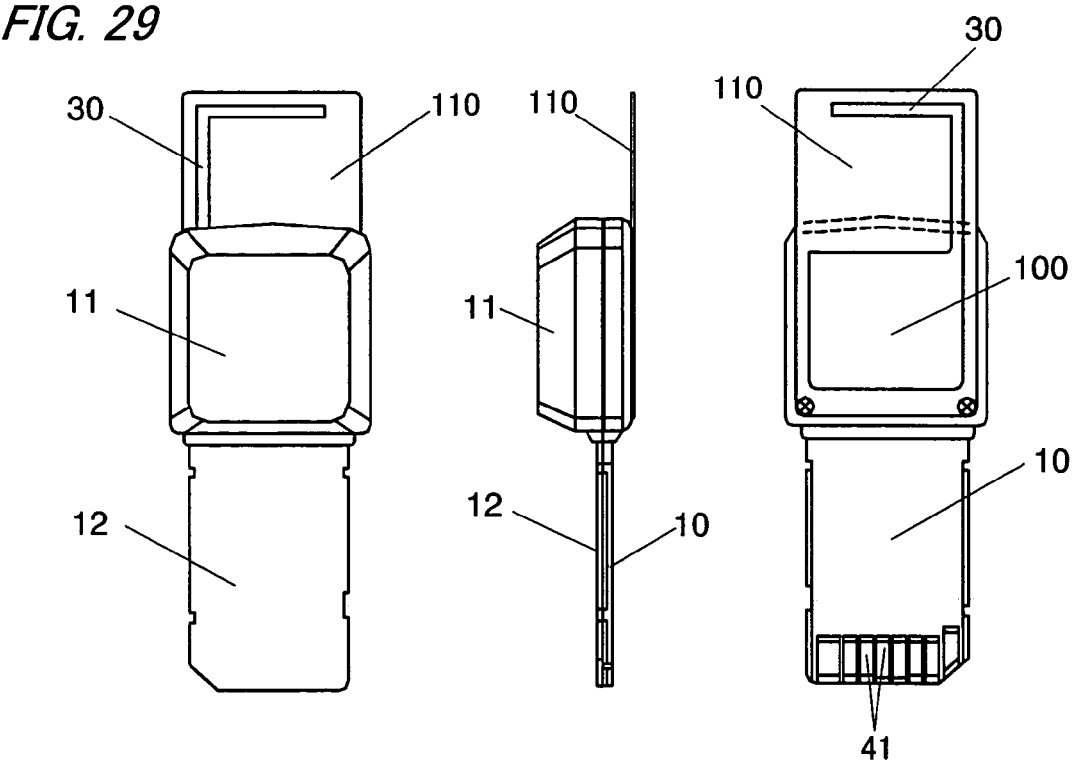
FIG. 29 is a modified form of the stub piece of the antenna unit of FIG. 25.

Alternatively, as shown in FIG. 29, the antenna unit may further include a thin and nonconductive sheet 110. The sheet 110 is attached to the outer bottom of the case, and the plate 100 and the stub piece 30 are formed in the sheet 110. The plate 100 is capacitively coupled to the electromagnetic shield 22 through the bottom of the base 10 when the sheet 110 is attached to the outer bottom of the case. In this case, it is easy to manufacture the antenna unit because the noise canceller can be constructed by just attaching the sheet 110 to the case after assembling the antenna unit.

Figure 30:
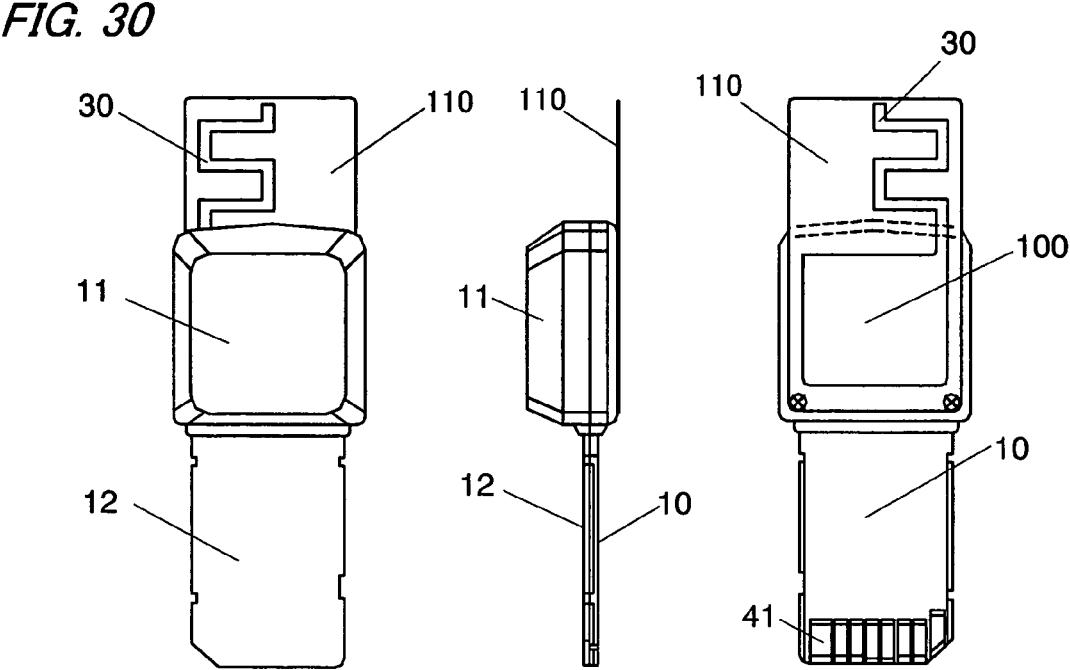
FIG. 30 is a modified form of the stub piece of the antenna unit of FIG. 29.
Figure 31:
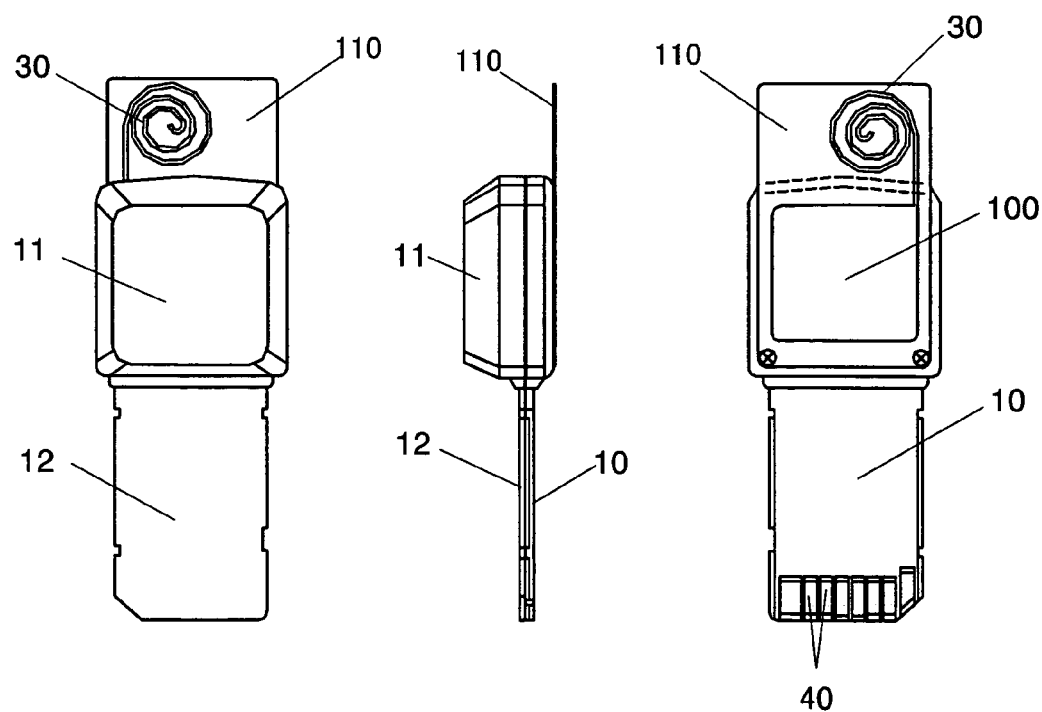
FIG. 31 is a modified form of the stub piece of the antenna unit of FIG. 29.

The shape of the stub piece 30 in the sheet 110 may be a meander shape as shown in FIG. 30, or may be a convoluted shape as shown in FIG. 31. In each case, the overhang of the sheet 110 can be shortened.

Preferably, as shown in FIG. 32, one or more perforations 120 along which the end of the stub piece 30 can be torn are made on the sheet 110. In this case, the length of the stub piece 30 can be adjusted by tearing the end of the stub piece 30 from the sheet, so that a user can select a proper length of the stub piece with respect to the satellite signals of different frequencies (for example, about 1.6 GHz or 1.2 GHz).

The shape of the sheet 110 is not limited to a rectangle, but it may be a shape which was cut out along the shape of the plate 100 and the stub piece 30, as shown in FIG. 33A. In this case, as shown in FIG. 33B, the sheet 110 can be pasted on the outer surface of the case, so that the overhang of the sheet 110 can be eliminated. In this case, too, one or more perforations 120 along which the end of the stub piece 30 can be torn may be made on the sheet 110, as shown in FIG. 33A, so as to adjust the length of the stub piece, as shown in FIG. 33C.

Figure 34A:
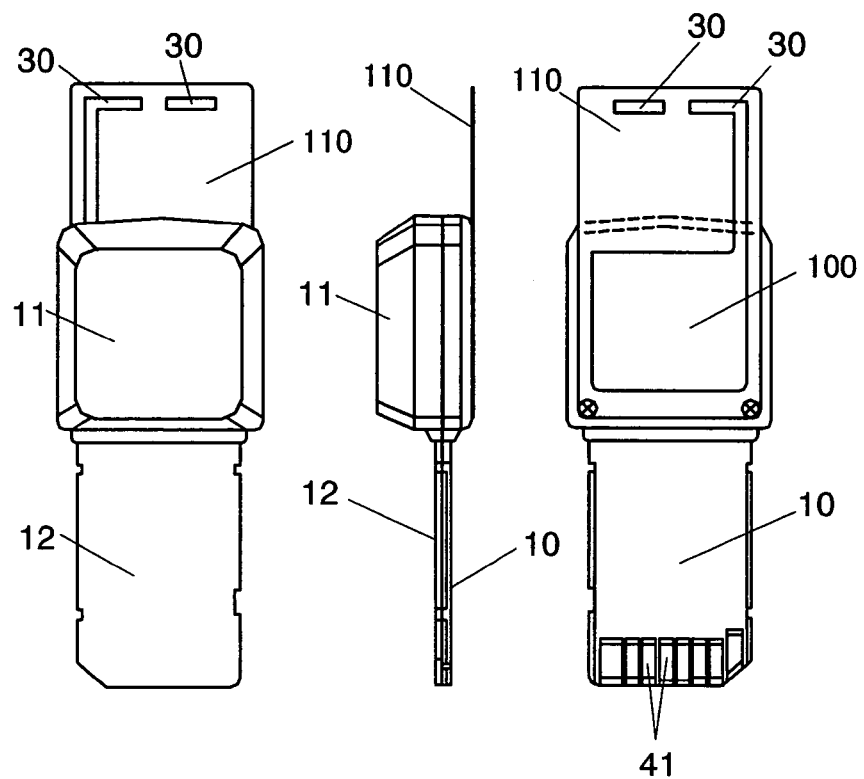
FIG. 34A is a modified form of the stub piece of the antenna unit of FIG. 29.
Figure 34B:
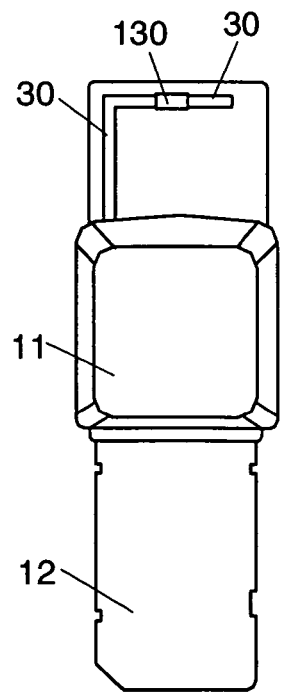
FIG. 34B is a view of the antenna unit of FIG. 34A in which the stub pieces are connected to each other by a jumper.

Alternatively, as shown in FIG. 34A, the stub piece 30 may be divided into two or more in the sheet 110, and as shown in FIG. 34B, the divided stub pieces 30 may be connected to each other by a conductive jumper 130, if needed. In this case, a user can select a proper length of the stub piece according to the wavelength of the satellite signal by attaching the jumper 130 or removing it.

Figure 35A:
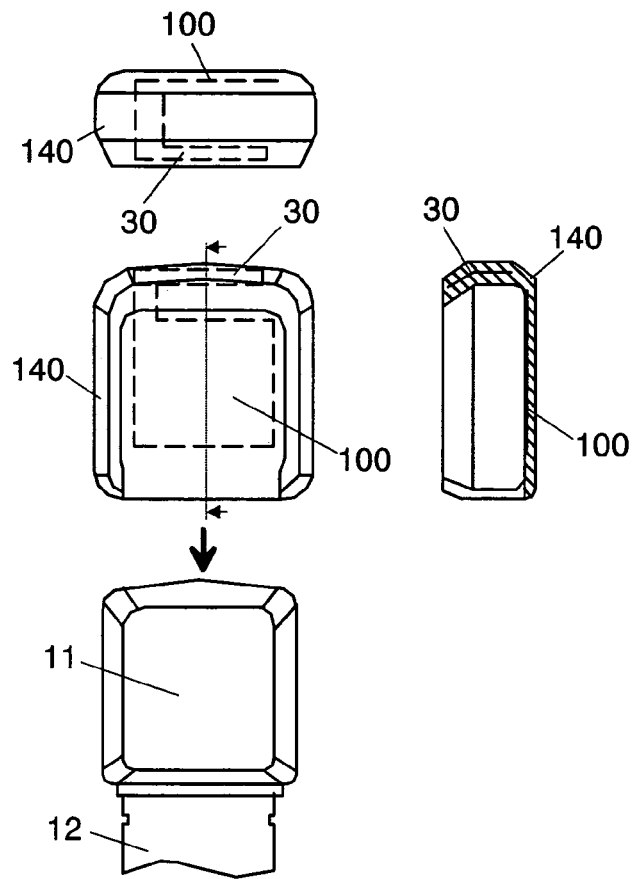
FIG. 35A is a modified form of the stub piece of the antenna unit of FIG. 25.
Figure 35B:
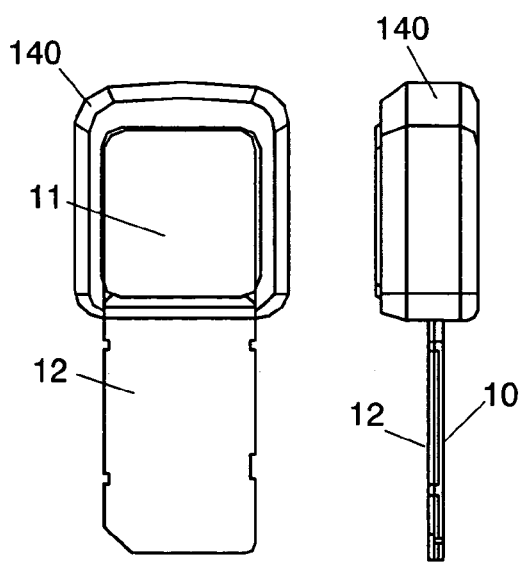
FIG. 35B is a view of the antenna unit to which a head cover of FIG. 35A is attached.

Alternatively, as shown in FIG. 35A, the antenna unit may be provided with a plastic case cover 140, which can be attached to the outer bottom of the case as well as the side faces of the head cover 11, and the plate 100 and the stub piece 30 may be insert-molded into the case cover 140. The plate 100 is disposed on the bottom of the case cover 140, and, as shown in FIG. 35B, when the case cover 140 was attached to the outer bottom of the case, the plate 100 will be capacitively coupled to the electromagnetic shield 22 through the base 10. In this case, since the noise canceller can be constructed by just attaching the case cover 140 to the antenna unit, the noise cancellation function can be easily added to the conventional antenna unit.

Figure 36:
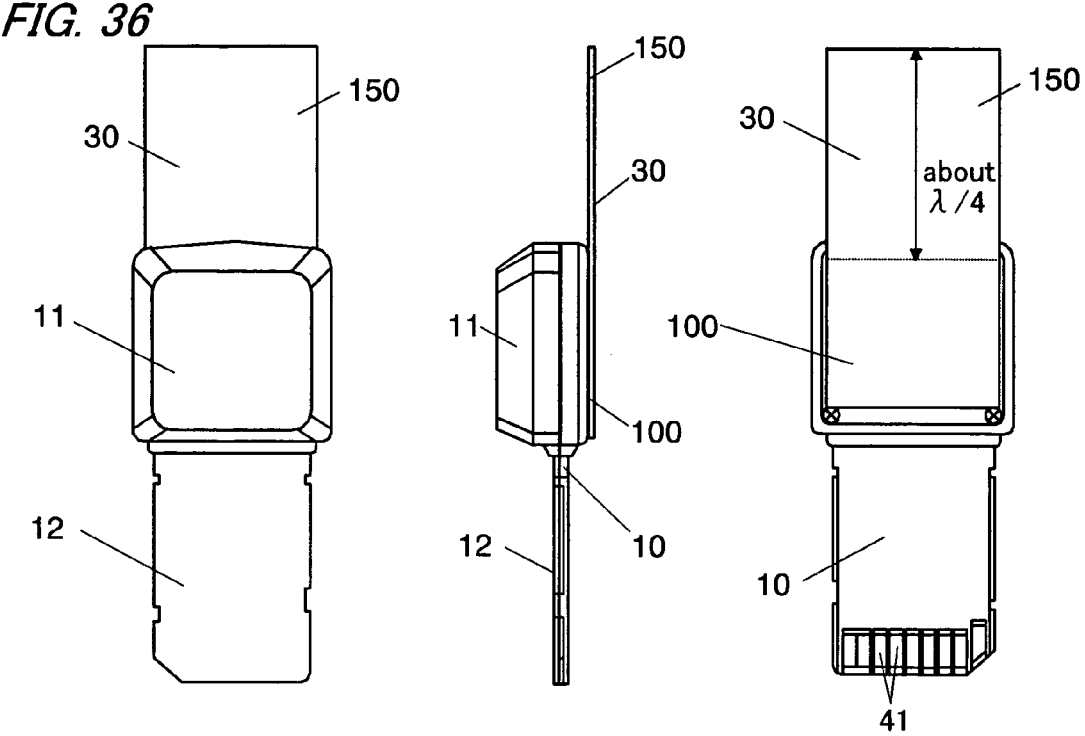
FIG. 36 is a modified form of the stub piece of the antenna unit of FIG. 25.
Figure 37:
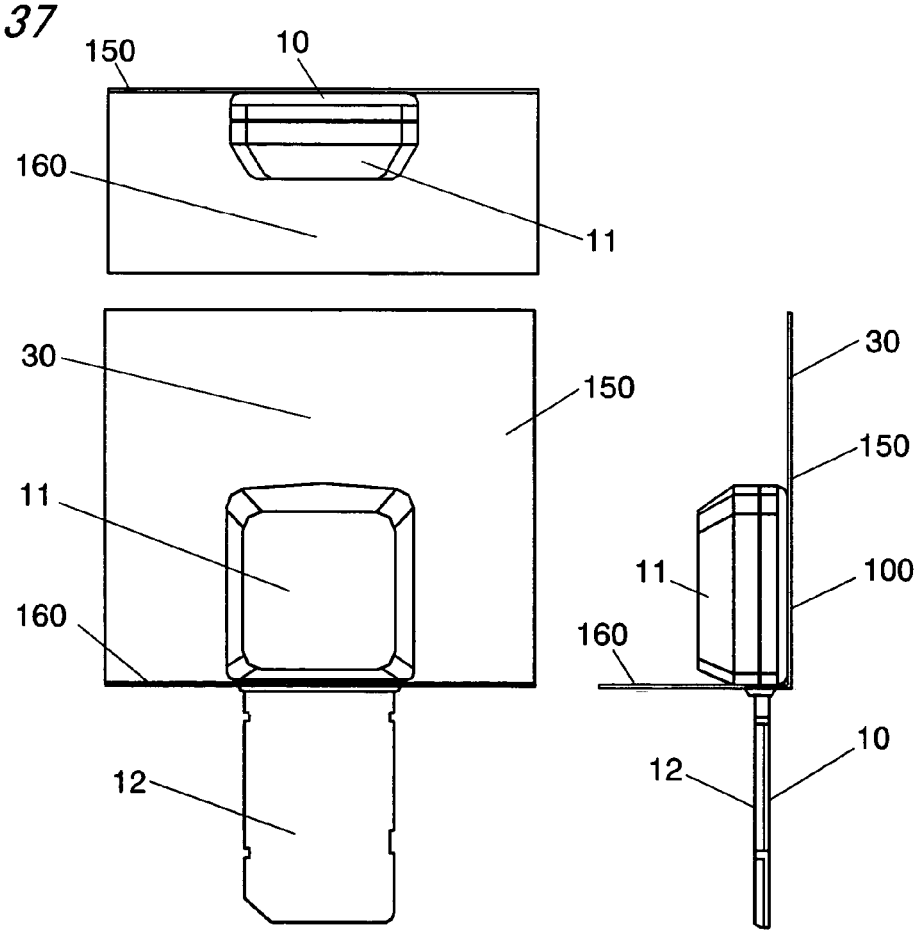
FIG. 37 is a modified form of the stub piece of the antenna unit of FIG. 36.

Alternatively, as shown in FIG. 36, the stub piece may be in a form of a flat plate extending from the plate 100 attached to the outer bottom of the case. That is, the plate 100 and the stub piece 30 may be a single conductive flat plate 150 attached to the outer bottom of the case. A section of the flat plate 150 located on the bottom of the base 10 and capacitively coupled to the electromagnetic shield 22 acts as the plate 100, and a section of the flat plate 150 projecting from the base 10 acts as the stub piece 30 whose one edge is connected to the plate 100. The length of the section of the flat plate 150 projecting from the base 10 is about ¼ of the wavelength of the satellite signal. As mentioned above, the shape of the stub piece 30 is not limited to the line shape (the straight line shape or the curved line shape), but it may be in the form of the flat plate. As shown in FIG. 37, it is preferable that the plate 100 is provided with a vertical plate 160 on the other side of the stub piece 30, which electromagnetically insulates the antenna unit from the electronic device when the antenna unit is connected to the electronic device, namely when the antenna unit is inserted into the electronic device. In this case, it becomes easy to block the noise propagated to the antenna unit from the electronic device through midair by the vertical plate 160, so the unit can enhance the effect of reducing the noise.

Figure 38A:
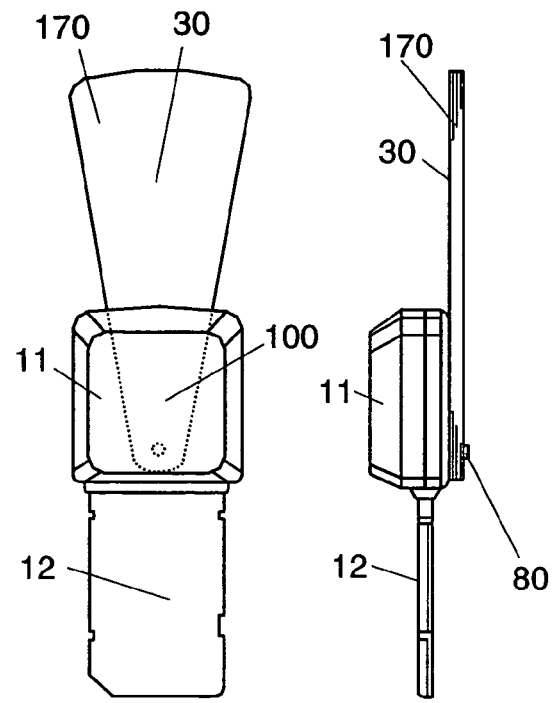
FIG. 38A is a modified form of the stub piece of the antenna unit of FIG. 36.
Figure 38B:
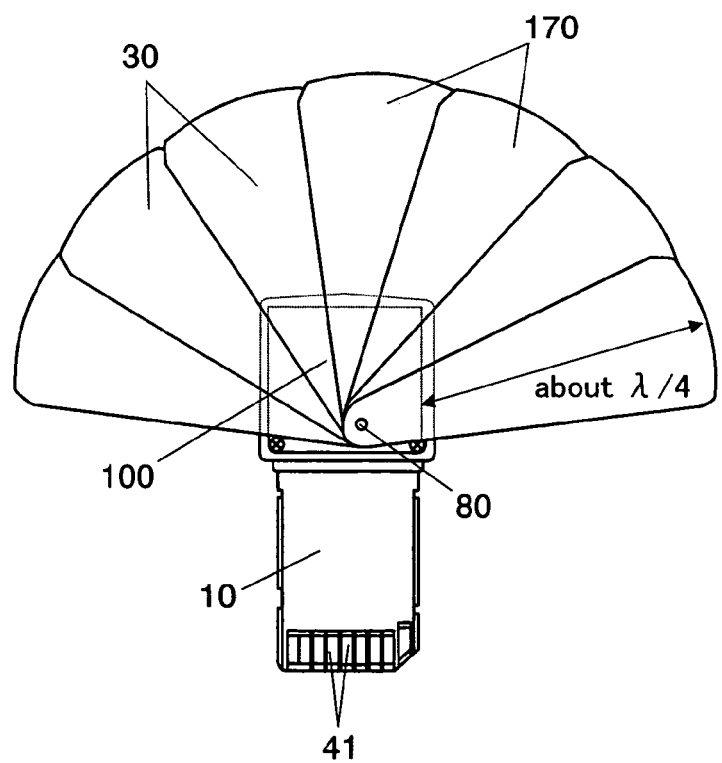
FIG. 38B is a view of the antenna unit of FIG. 38A whose plates were opened.

It is also preferable that, as shown in FIG. 38A and FIG. 38B, the plate 100 and the stub piece 30 are one fan-shaped plate 170, and the antenna unit is provided with two or more plates 170 as the noise canceller, and one end of each of the plates 170 is pivotally supported on the outer bottom of the case by the screw 80. As shown in FIG. 38B, a user can spread those plates 170 to one fan shape. In this case, a section of the plate 170 located on the bottom of the base 10 and capacitively coupled to the electromagnetic shield 22 acts as the plate 100, and a section of the plate 170 projecting from the base 10 acts as the stub piece 30. The length of the section of the plate 170 projecting from the base 10, that is, the section which acts as the stub piece, is about ¼ of the wavelength of the satellite signal. When the plates 170 is spread to the one fan shape, they can give an uniform stub length over a predetermined direction around the antenna unit, so that they can enhance the effect of reducing the noise. The plates 170 will not get in the way of the user by being grouped together while they are not used.

Figure 39A:
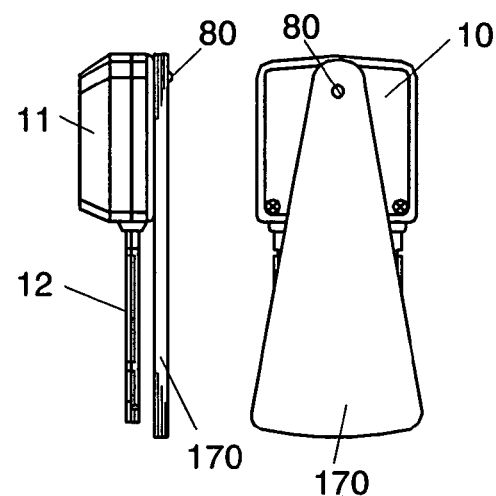
FIG. 39A is a modified form of the stub piece of the antenna unit of FIG. 36.
Figure 39B:
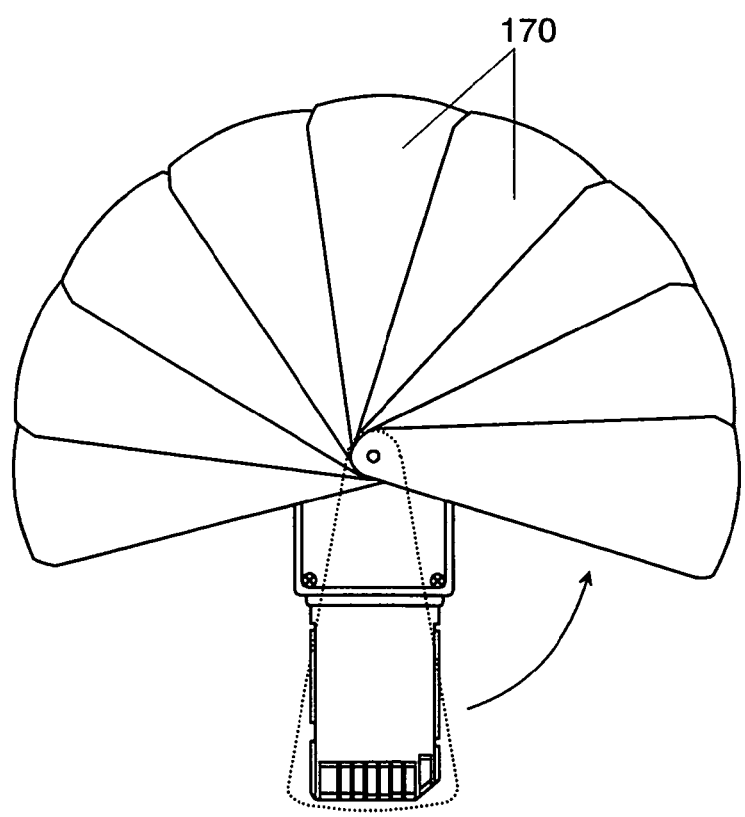
FIG. 39B is a view of the antenna unit of FIG. 39A whose plates were opened.

As shown in FIG. 39A, when the plate 170 are fixed on the front edge side of the base 10, a user can hide the plate 170 behind the case while they are not used, so the plate 170 will not get in the way of the user more. As shown in FIG. 39B, when a user wants to use the stub pieces 30, the user can rotate the plate 180 degrees and spread them to the fan shape.

Figure 40:
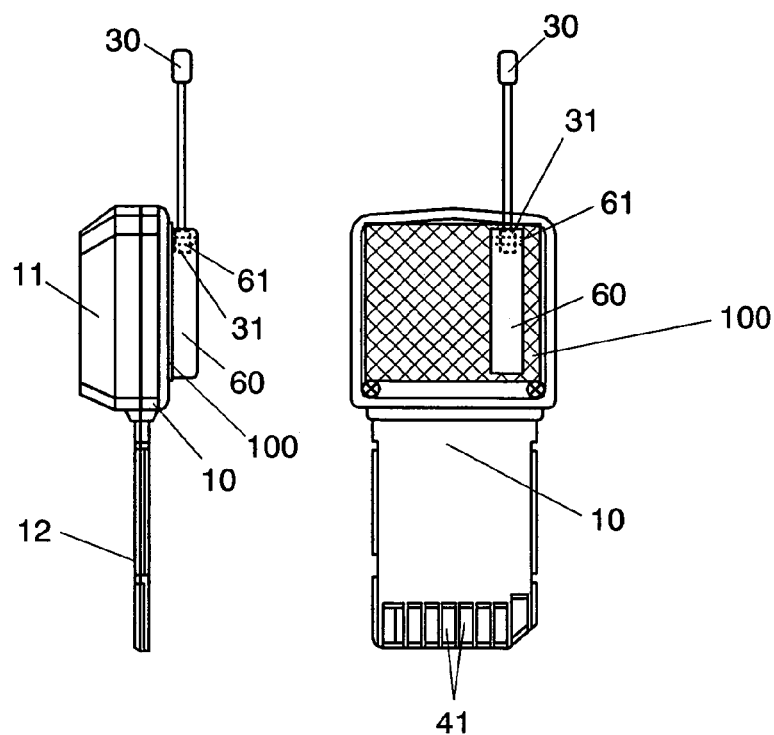
FIG. 40 is a modified form of the stub piece of the antenna unit of FIG. 25.
Figure 41:
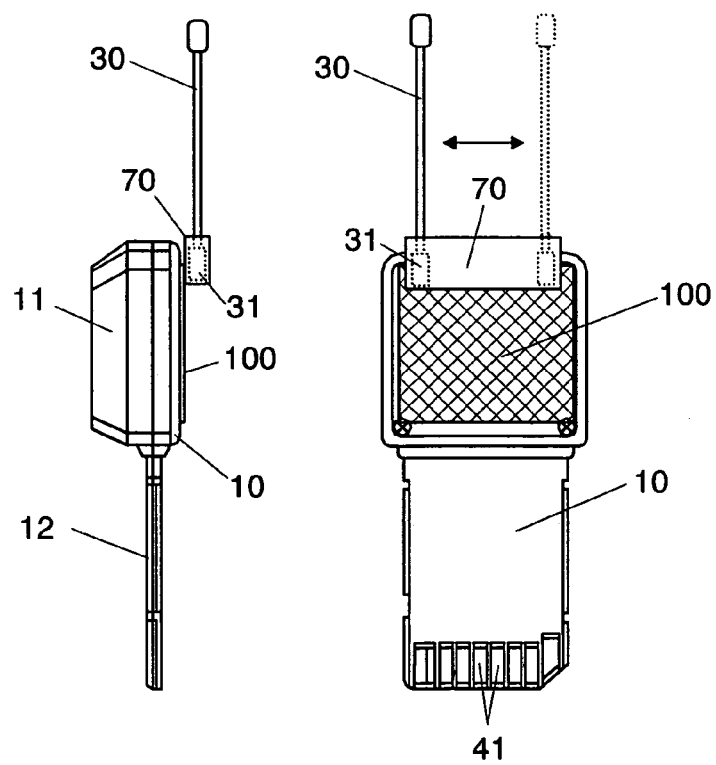
FIG. 41 is a modified form of the stub piece of the antenna unit of FIG. 25.
Figure 42:
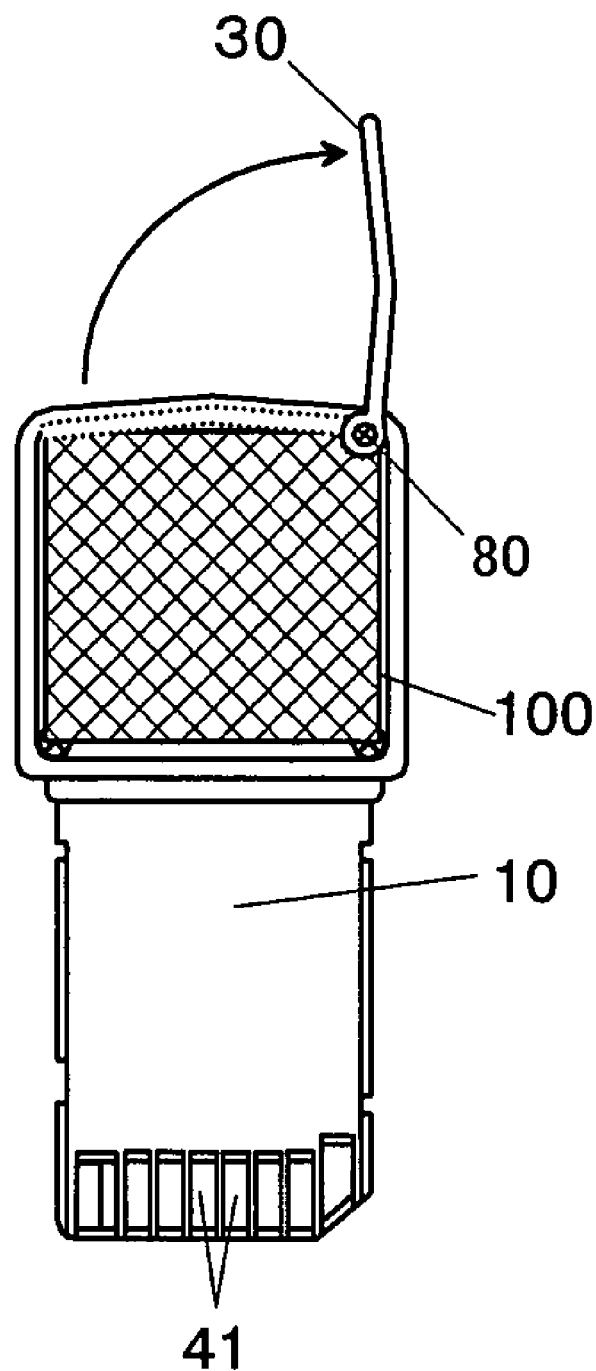
FIG. 42 is a modified form of the stub piece of the antenna unit of FIG. 25.

Based on the construction shown in the first embodiment, various modifications in which the stub piece 30 is electrically connected to the electromagnetic shield 22 through the plate 100 may be easily made other than the above mentioned construction. For example, FIG. 40 shows a modified form based on FIG. 14B of the first embodiment. In FIG. 40, the hardware 61 is electrically connected to the plate 100, not to the electromagnetic shield 22, and the stub piece 30 is electrically connected to the electromagnetic shield 22 through the hardware 61 and the plate 100. And, FIG. 41 shows a modified form based on FIG. 17 of the first embodiment. In FIG. 41, the inner surface of the insertion hole 71 is electrically connected to the plate 100, not to the electromagnetic shield 22, and the stub piece 30 is electrically connected to the electromagnetic shield 22 through the inner surface of the insertion hole 71 and the plate 100. Further, FIG. 42 shows a modified form of FIG. 19A in the first embodiment. In FIG. 42, the screw 80 is electrically connected to the plate 100, and the stub piece 30 is electrically connected to the electromagnetic shield 22 through the screw 80 and the plate 100.

As mentioned above, as many apparently widely different embodiments of this invention may be made without departing from the spirit and scope thereof, it is to be understood that the invention is not limited to the specific embodiments thereof except as defined in the appended claims.

The invention claimed is:

1. An antenna unit adapted to be connected to an electronic device for transmitting a received radio signal to the electronic device, said antenna unit comprising:

an antenna configured to receive a radio signal;

a signal processing module configured to convert the radio signal received by said antenna into signal data to be transmitted to the electronic device;

a substrate configured to carry said antenna and said signal processing module, said substrate having a circuit ground forming a ground of said signal processing module;

a terminal interface configured to have an array of terminals for electrical connection with the electronic device, said terminal interface including a ground line leading from a ground terminal provided in the array of terminals to the circuit ground;

an electromagnetic shield configured to surround said signal processing module so as to electromagnetically isolate the signal processing module from the antenna, said electromagnetic shield being electrically connected to the circuit ground;

a case made of insulating resin, said case being configured to accommodate said antenna, said substrate, said signal processing module, said terminal interface, and said electromagnetic shield while exposing said array of terminals;

wherein said antenna unit includes a noise canceller for canceling noise generated in the electronic device and transmitted to the circuit ground through the ground line, said noise canceller comprising a conductive stub piece one end of which is electrically connected to said electromagnetic shield and the other end of which is a free end, said stub piece having a length of about ¼ of a wavelength of the radio signal.

2. The antenna unit as set forth in claim 1, wherein said stub piece is made of a wire.

3. The antenna unit as set forth in claim 1, wherein said stub piece is formed by cutting a part of said electromagnetic shield and bending it.

4. The antenna unit as set forth in claim 1, wherein said stub piece is a rod member which is extendable relative to said case.

5. The antenna unit as set forth in claim 1, wherein said stub piece is a rod member,
said case having a receptacle on an outer bottom of it whose inner surface is electrically connected to said electromagnetic shield,
one end of said stub piece being inserted into said receptacle and electrically connected to said electromagnetic shield through the inner surface of said receptacle.

6. The antenna unit as set forth in claim 1, wherein said stub piece is a rod member one end of which is pivotally supported on the outer bottom of the case.

7. The antenna unit as set forth in claim 1, wherein said stub piece is in a form of a flat plate.

8. The antenna unit as set forth in claim 7, wherein said stub piece is disposed on an outer bottom of the case and provided with a vertical plate which electromagnetically insulates said antenna unit from the electronic device when said antenna unit is connected to the electronic device.

9. The antenna unit as set forth in claim 7, wherein said stub piece is in a form of a fan,
said noise canceller comprising two or more said stub pieces,
one end of each of said stub pieces being pivotally supported on an outer bottom of said case.

10. The antenna unit as set forth in claim 1, wherein said electromagnetic shield is disposed on an inner bottom of the case,
said antenna unit further comprising a plate which is capacitively coupled to
said electromagnetic shield through a bottom of the case,
one end of the stub piece being connected to said plate and said stub piece being electrically connected to said electromagnetic shield through said plate.

11. The antenna unit as set forth in claim 10, wherein said plate is attached to an outer bottom of the case,
said stub piece being formed by cutting a part of said plate and bending it.

12. The antenna unit as set forth in claim 10, wherein said stub piece is insert-molded into said case together with said plate.

13. The antenna unit as set forth in claim 10, further comprising
a sheet member attached to an outer bottom of said case, said plate and said stub piece being formed in said sheet.

14. The antenna unit as set forth in claim 10, further comprising
a case cover attached to an outer bottom of the case,
said plate and said stub piece being insert-molded into said case cover.

15. The antenna unit as set forth in claim 10, wherein said plate is attached to an outer bottom of said case,
said stub piece being in a form of a flat plate extending from said plate.

16. The antenna unit as set forth in claim 15, wherein said plate is provided with a vertical plate which electromagnetically insulates said antenna unit from the electronic device when said antenna unit is connected to the electronic device.

17. The antenna unit as set forth in claim 15, wherein said plate and said stub piece are a fan-shaped plate,
said noise canceller comprising two or more said fan-shaped plates,
one end of each of said fan-shaped plates being pivotally supported on the outer bottom of the case.

* * * * *